(12) United States Patent
Bae

(10) Patent No.: US 9,904,400 B2
(45) Date of Patent: Feb. 27, 2018

(54) ELECTRONIC DEVICE FOR DISPLAYING TOUCH REGION TO BE SHOWN AND METHOD THEREOF

(71) Applicant: Samsung Electronics Co. Ltd., Suwon-si, Gyeonggi-do (KR)

(72) Inventor: Hye-Rim Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 13/965,883

(22) Filed: Aug. 13, 2013

(65) Prior Publication Data

US 2014/0043268 A1 Feb. 13, 2014

(30) Foreign Application Priority Data

Aug. 13, 2012 (KR) .................. 10-2012-0088362

(51) Int. Cl.
*G06F 3/041* (2006.01)
*G06F 3/0488* (2013.01)

(52) U.S. Cl.
CPC .......... *G06F 3/0416* (2013.01); *G06F 3/0488* (2013.01)

(58) Field of Classification Search
CPC ...... G06F 3/041; G06F 3/0416; G06F 3/0488; G06F 3/04883; G06F 3/01; G06F 15/00; G06F 15/0291; G06F 17/22; G06F 17/24; G06F 17/2294
See application file for complete search history.

(56) References Cited

U.S. PATENT DOCUMENTS

| 8,519,971 | B1* | 8/2013 | Mackraz | G06F 3/147 313/504 |
|---|---|---|---|---|
| 2005/0120302 | A1* | 6/2005 | Altman et al. | 715/530 |
| 2006/0013462 | A1 | 1/2006 | Sadikali | |
| 2007/0180397 | A1* | 8/2007 | Hoyer | G06F 3/04886 715/780 |
| 2007/0186158 | A1 | 8/2007 | Kim et al. | |
| 2009/0167700 | A1 | 7/2009 | Westerman et al. | |
| 2009/0184935 | A1* | 7/2009 | Kim | 345/173 |
| 2010/0289820 | A1 | 11/2010 | Hoyer et al. | |
| 2010/0295805 | A1 | 11/2010 | Shin et al. | |
| 2011/0043453 | A1 | 2/2011 | Roth et al. | |
| 2011/0043455 | A1* | 2/2011 | Roth et al. | 345/173 |
| 2011/0202835 | A1* | 8/2011 | Jakobsson et al. | 715/702 |
| 2012/0032979 | A1* | 2/2012 | Blow | G06F 1/1626 345/647 |

FOREIGN PATENT DOCUMENTS

| CN | 101036147 A | 9/2007 |
|---|---|---|
| KR | 10-0954324 B1 | 4/2010 |
| KR | 10-2011-0011002 A | 2/2011 |
| KR | 10-2011-0041802 A | 4/2011 |

\* cited by examiner

*Primary Examiner* — Jennifer Mehmood
*Assistant Examiner* — Sardis F Azongha
(74) *Attorney, Agent, or Firm* — Jefferson IP Law, LLP

(57) ABSTRACT

An electronic device for displaying a touch region to be shown and a method thereof are provided. The method includes verifying an input touch region and adjusting a layout of a screen such that the touch region is not covered. Accordingly, a user is able to see a touch region without taking their finger, etc. used for a touch of a touch screen off the touch screen.

14 Claims, 15 Drawing Sheets as "Next to Normal" does. This brave, breathtaking musical, which opened Wednesday night at the Booth Theater, focuses squarely on the pain that cripples the members of a suburban family, and never for a minute does it let you escape the anguish at the core of their lives.
"Next to Normal" does not, in other words, qualify as your standard feel-good music...
Instead this portrait of a manic-depressive mother and the people she loves and damages is something much more: a feel-everything musical, which asks you, with operatic force, to 403
401
402
404
405

FIG.4A opened Wednesday night at the Booth Theater, focuses squarely on the pain that cripples the members of a suburban family, and never for a minute does it let you escape the anguish at the core of their lives.
"Next to Normal" does not, in other words, qualify as your standard feel-good musical Instead this portrait of a manic-depressive mother and the people she loves and damages is something much more: a feel-everything musical, which asks you, with operatic force, to

FIG.4B wouldn't stay with it unless they were allowed to take an irony break from time to time. But the comic exaggerations and distortions had the opposite effect. Pull back from "Next to Normal," and you start to see that its plot isn't so different from those of dysfunctional-family movies of the week about healing and forgiveness.
As for the what-lurks-within-the-rec-room aspect, there has been a surfeit of such exposés — in film, television and literature — since "American Beauty" took the Oscar a decade ago.

But the creators of "Next to Normal" realized they had something of authentic and original value beneath the formulaic flourishes. For the 407
406
408

FIG.4C wouldn't stay with it unless they were allowed to take an irony break from time to time. But the comic exaggerations and distortions had the opposite effect. Pull back from "Next to Normal," and you start to see that its plot isn't so different from those of dysfunctional-family movies of the week about healing and forgiveness. As for the what-lurks-within-the-rec-room aspect, there has been a surfeit of such exposés — in film, television and literature — since "American Beauty" took the Oscar a decade ago.
But the creators of "Next to Normal" realized they had something of authentic and original value beneath the formulaic flourishes. For the retooled version, first seen at the Arena Stage in Washington in

FIG.4D

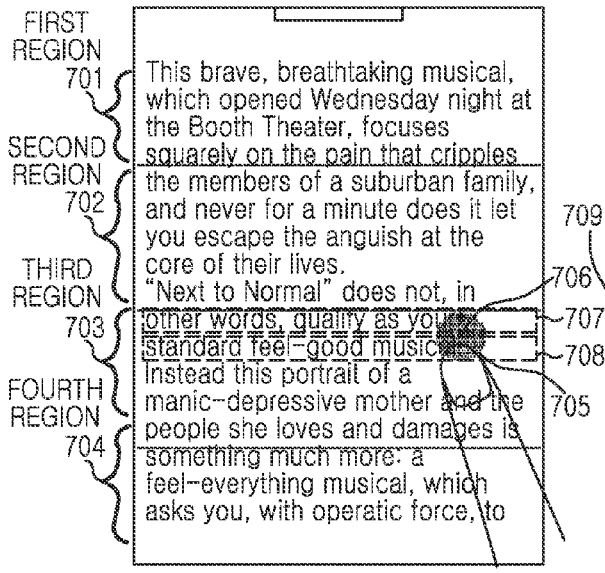
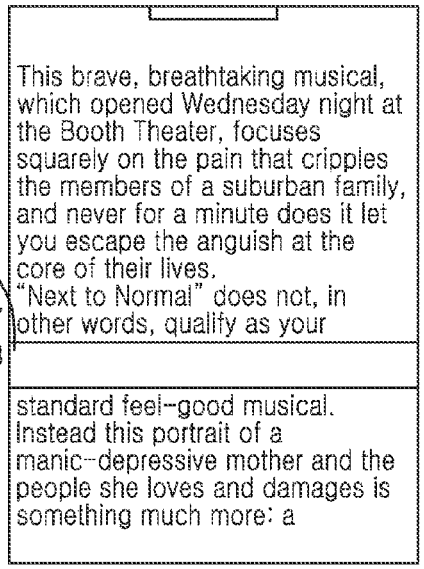
FIG.7A      FIG.7B
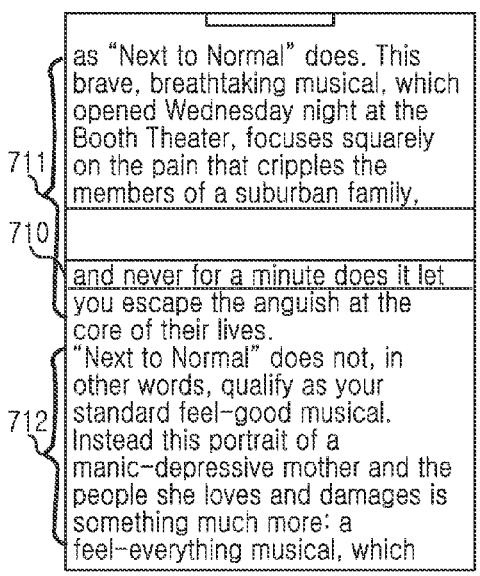
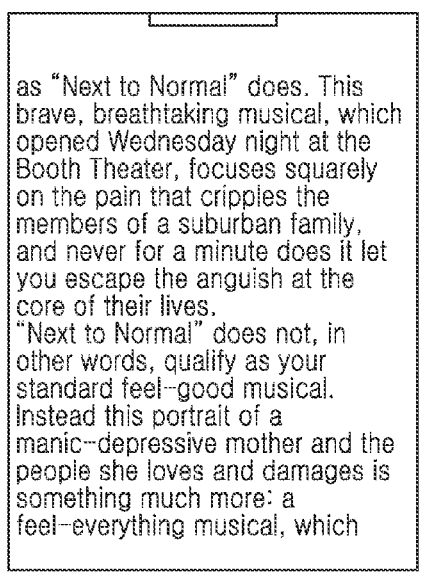
FIG.7C      FIG.7D as "Next to Normal" does. This brave, breathtaking musical, which opened Wednesday night at the Booth Theater, focuses squarely on the pain that cripples the members of a suburban family, and never for a minute does it let you escape the anguish at the core of their lives.
"Next to Normal" does not, in other words, qualify as your standard feel-good musical. Instead this portrait of a manic-depressive mother and the people she loves and damages is something much more: a feel-everything musical, which asks you, with operatic force, to

— 801
— 802
— 803

FIG.8A as "Next to Normal" does. This brave, breathtaking musical, which opened Wednesday night at the Booth Theater, focuses squarely on the pain that cripples the members of a suburban family, and never for a minute does it let you escape the anguish at the core of their lives.
"Next to Normal" does not, in other words, qualify as your standard feel-good musical. Instead this portrait of a manic-depressive mother and the people she loves and damages is something much more: a feel-everything musical, which asks you, with operatic force, to

That theme was also at the center of the production that opened Off Broadway last year (at the Second Stage Theater) under the same title and with most of the same cast, technical team and music. Yet the differences between "Next to Normal" then and now are substantial enough to inspire hope for all imbalanced shows in need of rehabilitation.

FIG.8C

That theme was also at the center of the production that opened Off Broadway last year (at the Second Stage Theater) under the same title and with most of the same cast, technical team and music. Yet the differences between "Next to Normal" then and now are substantial enough to inspire hope for all imbalanced shows in need of rehabilitation.

FIG.8D

ELECTRONIC DEVICE FOR DISPLAYING TOUCH REGION TO BE SHOWN AND METHOD THEREOF

PRIORITY

This application claims the benefit under 35 U.S.C. § 119(a) of a Korean patent application filed on Aug. 13, 2012 in the Korean Intellectual Property Office and assigned Serial No. 10-2012-0088362, the entire disclosure of which is hereby incorporated by reference.

BACKGROUND OF THE INVENTION

1. Field of the Invention

The present invention relates to an electronic device for displaying a touch region to be shown and a method thereof.

2. Description of the Related Art

Recently, as smart phone devices have rapidly come into wide use, users are growing more and more interested in multi-touch technologies used in a touch screen, etc. Accordingly, many new products that are applicable to such electronic devices having multi-touch technologies have been released to the market for improving a user's convenience.

However, there is a problem in that a region touched by a finger or a stylus pen, etc. of a user, which are used for a touch, is covered when he or she touches an electronic device having a touch function. For example, when the user reads articles written on a webpage while scrolling a touch screen using his or her finger, he or she may not see articles included in a touch region because they are covered by his or her finger. That is, in order to read text included in the touch region, there is an inconvenience in that the user must take his or her finger used for the touch off of the touch screen.

Therefore, an electronic device for allowing the user to see the touch region covered by the touch without taking his or her finger or input tool, etc. used for the touch off the touch screen is needed.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for allowing a user to see a touch region without taking his or her finger, etc. used for a touch of a touch screen off the touch screen.

Another aspect of the present invention is to provide an apparatus and method for improving convenience for a user by automatically adjusting a layout of a divided screen.

Another aspect of the present invention is to provide an apparatus and method for reflecting diverse preferences of a user by freely setting a length, a height, etc. of a transparent layer inserted into a touch region.

In accordance with an aspect of the present invention, an operating method of an electronic device is provided. The method includes verifying an input touch region and adjusting a layout of a screen such that the touch region is not covered.

In accordance with another aspect of the present invention, an electronic device is provided. The electronic device includes a processor unit for verifying an input touch region and for adjusting a layout of a screen such that the input touch region is not covered, and a memory for storing information controlled by the processor unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 4A to 4D illustrate a process of adjusting a layout of a screen such that a touch region is not covered according to an exemplary embodiment of the present invention;

FIGS. 7A to 7D illustrate a process of adjusting a layout of a screen such that a touch region is not covered according to an exemplary embodiment of the present invention;

FIGS. 8A to 8D illustrate a process of adjusting a layout of a screen such that a touch region is not covered according to an exemplary embodiment of the present invention;

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
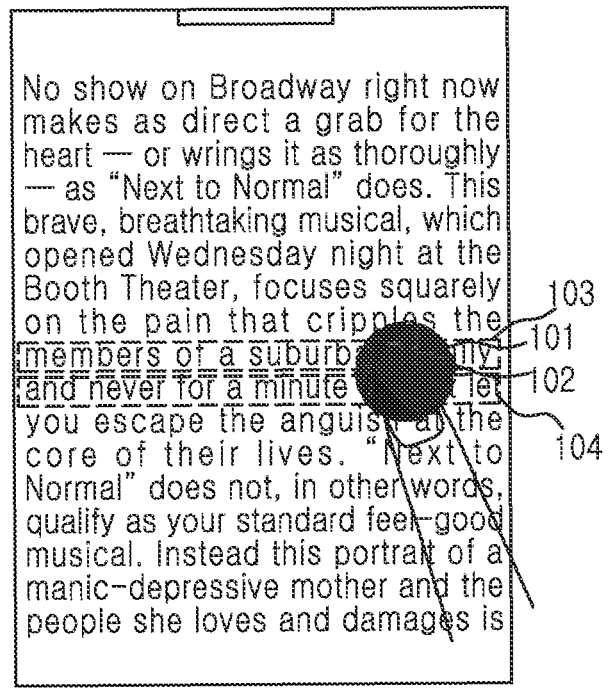
FIGS. 1A and 1B are screens illustrating a visual function according to an exemplary embodiment of the present invention.
Figure 1B:
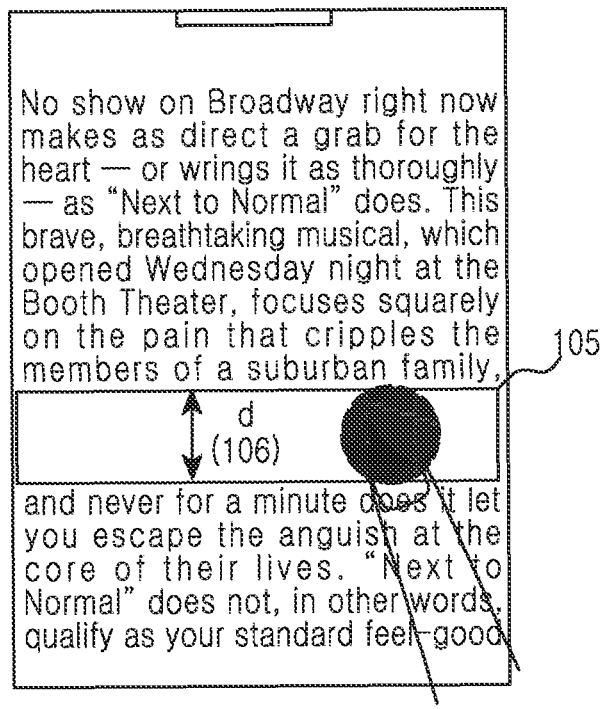

FIGS. 1A and 1B are screens illustrating a visual function according to an exemplary embodiment of the present invention.

First of all, the visual function may be defined as a function for allowing a user to see a touch region without taking his or her finger, etc. used for a touch of a touch screen off the touch screen. In more detail, the visual function denotes a function for preventing a portion from being covered by a touch of the user although he or she touches a certain region of the touch screen. That is, the visual function is a function for allowing the user to see a portion covered by his or her touch, etc. without taking his or her finger, etc. off the touch screen when he or she touches a screen displayed on the touch screen with his or her finger, stylus pen, etc.

There is a problem in the related art that the user may not see a touch region due to a touch of the touch screen when he or she touches a screen displayed on the touch screen. That is, in order to see a portion covered by the touch, the user must take his or her finger, etc., which performs the touch input, off the touch screen. For example, when the user lies down and reads a screen displayed on the touch screen, there is an inconvenience in that he or she must hold a bezel of an electronic device because a touch region is covered although it is more comfortable to see the screen while touching the touch screen with his or her finger. However, according to an exemplary embodiment of the present invention, there is an advantage in that the user may see a portion covered by a touch of the touch screen without taking his or her finger, etc. off the touch screen.

FIG. 1A is a screen illustrating a process of verifying a touch region according to an exemplary embodiment of the present invention.

Referring to FIG. 1A, when a user performs a touch input of a certain region of a touch screen of an electronic device while reading text displayed on the touch screen, the electronic device verifies a touch region 101. In more detail, when a touch input of the certain region of the touch screen is received from the user, the electronic device determines whether text is included in the input touch region 101.

If it is determined that text is included in the touch region 101 which receives the touch input from the user, the electronic device searches the nearest empty line space from a center coordinate 102 of the touch region 101. Herein, the empty line space may be an empty line space between lines composing text displayed on the touch screen, or may be a blank space between any one of numbers, characters, and symbols composing text. That is, an execution range of the visual function according to an exemplary embodiment of the present invention may be a line composing text and may be any one of a number, a character, and a symbol composing text. In an exemplary embodiment shown in FIG. 1A, it is assumed that the execution range of the visual function is set to a line composing text. Accordingly, the electronic device searches an empty line space between the nearest lines composing text from the center coordinate 102 of the touch region 101. For example, as shown in FIG. 1A, because the center coordinate 102 of the touch region 101 is located between first and second lines 103 and 104, the electronic device may verify that a space between the nearest lines from the center coordinate 102 is between the first line 103 and the second line 104.

FIG. 1B is a screen illustrating a process of dividing a displayed screen such that a touch region is not covered according to an exemplary embodiment of the present invention.

Referring to FIG. 1B, to divide the displayed screen is to divide text into two portions such as an upper portion and a lower portion based on a transparent layer by inserting the transparent layer into lines composing text. Or, to divide the displayed screen is to divide any one of numbers, characters, and symbols composing text by a space of a set transparent layer by inserting the transparent layer into any one of the numbers, characters, and symbols composing text. In more detail, to divide the displayed screen may be defined to insert a transparent layer into lines composing text or any one of numbers, characters, and symbols composing text.

In an exemplary embodiment of the present invention shown in FIG. 1B, it is assumed that a transparent layer is inserted between lines composing text and a displayed screen is divided. In more detail, if the electronic device searches a space between the nearest lines from a center coordinate, it inserts a set transparent layer into the searched space between the lines and divides the displayed screen. For example, as shown in FIG. 1B, the electronic device inserts a transparent layer 105 of a set height d 106 into a space between the nearest lines from a center coordinate and divides a screen such that a touch region is not covered from a finger, etc. of the user. That is, the electronic device divides the screen by inserting the transparent layer 105 into a touch region and moving the displayed screen to an upper side and a lower side based on the inserted transparent layer. Accordingly, there is an advantage in that the electronic device according to an exemplary embodiment of the present invention inserts the set transparent layer 105 into a touch region such that the user also sees the touch region covered by his or her finger, etc.

FIGS. 2A to 2D are screens illustrating a processing of setting a visual function according to an exemplary embodiment of the present invention.

Figure 2A:
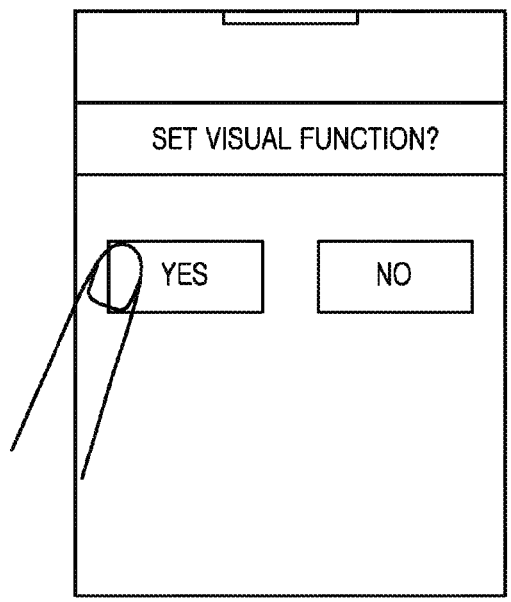
FIGS. 2A to 2D are screens illustrating a process of setting a visual function according to an exemplary embodiment of the present invention.

Referring to FIGS. 2A to 2D, an electronic device displays a message about whether to set a visual function through a certain process. As shown in FIG. 2A, if a setting of the visual function is received from a user, the electronic device displays messages shown in FIGS. 2B to 2D to receive detailed items of the visual function.

Figure 2B:
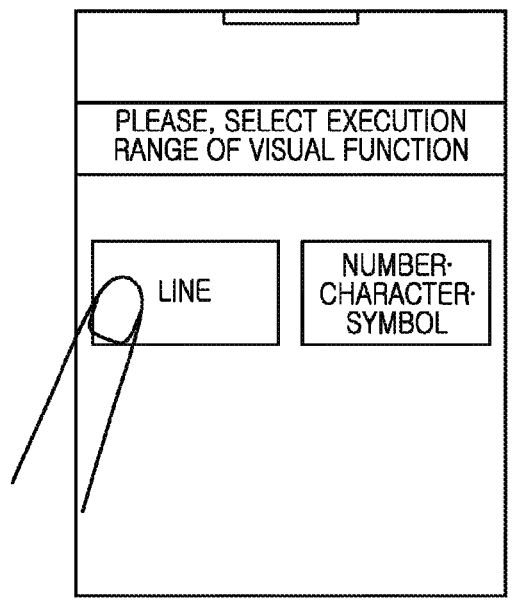

Receiving the setting of the visual function from the user, the electronic device displays a message for allowing the user to select an execution range of the visual function. Herein, the execution range of the visual function may be sentences composing text displayed on a touch screen of the electronic device. The execution range of the visual function may also be any one of numbers, characters, and symbols composing text. In more detail, when the execution range of the visual function is set to a line, if a touch input is received from the user, the electronic device searches an empty line space between the nearest lines from a center coordinate of a touch region. Also, when the execution range of the visual function is set to any one of numbers, characters, and symbols, if a touch input is received from the user, the electronic device searches a blank space between any one of the nearest numbers, characters, and symbols from a center coordinate of a touch region. That is, when the execution range of the visual function is set to the line, the electronic device searches the empty line space between the lines composing the text and the center coordinate of the touch region and inserts a transparent layer into the corresponding space. Also, when the execution range of the visual function is set to any one of the numbers, the characters, and the symbols, the electronic device searches the blank space between any one of the numbers, the characters, and symbols composing text and the center coordinate of the touch region and the electronic device inserts a transparent layer into the corresponding space. As shown in FIG. 2B, if a line which is set to the execution range of the visual function is received from the user, the electronic device displays a message shown in FIG. 2C to receive a height of a transparent layer.

Figure 2C:
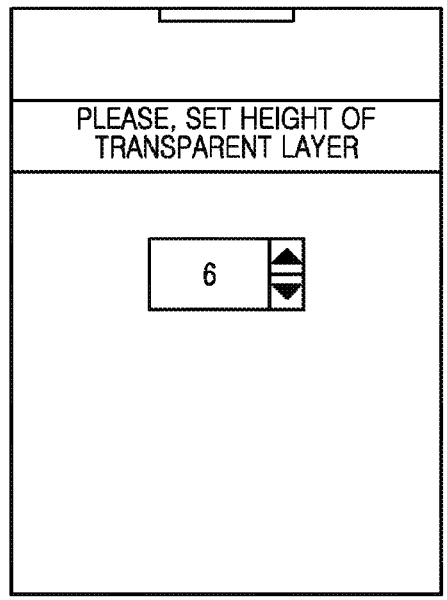

Receiving the execution range of the visual function from the user, the electronic device displays, as shown in FIG. 2C, a message for allowing the user to set a height of a transparent layer. Herein, the transparent layer may be defined as an empty line space inserted into a touch region. In more detail, when the execution range of the visual function is set to a line, the transparent layer is inserted between lines composing text and divides the text into two portions such as an upper portion and a lower portion. Also, when the execution range of the visual function is set to a number, character, and symbol, the transparent layer is inserted between any one of numbers, characters, and symbols composing text and divides any one of the numbers, characters, and symbols composing the text by a space of a set transparent layer.

In accordance with an exemplary embodiment of the present invention, because the execution range of the visual function is set to a line, the electronic device receives a height of a transparent layer from the user. That is, if a high height of the transparent layer is received, the electronic device searches an empty line space between the nearest lines and a center of a touch region and inserts the transparent layer by a set height into the corresponding empty line space. Also, if a low height of the transparent layer is received, the electronic device searches an empty line space between the nearest lines from a center coordinate of a touch region and inserts the transparent layer by a set height into the corresponding empty line space. In conclusion, if a height of the transparent layer is set to a high height, an interval between two lines of a touch region is more broadly increased. If a height of the transparent layer is set to a low height, an interval between two lines of a touch region is more narrowly increased.

Figure 2D:
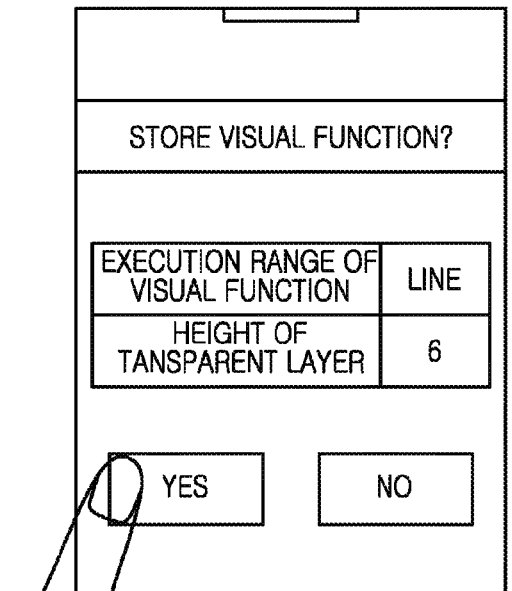

Receiving the height of the transparent layer, the electronic device displays a message about whether to store a visual function. As shown in FIG. 2D, the electronic device displays the execution range of the visual function together with the height of the transparent layer which are input from the user such that he or she verifies the input detailed items again before storing the visual function. For example, as shown in FIG. 2D, the electronic device displays that the input execution range of the visual function is the line and that the input height of the transparent layer is 6 while displaying the message about whether to store the visual function. If a message for indicating that the user wants to store the visual function is received from him or her, the electronic device executes the visual function including the set detailed items.

FIGS. 3A to 3D are screens illustrating a process of setting a visual function according to an exemplary embodiment of the present invention.

Figure 3A:
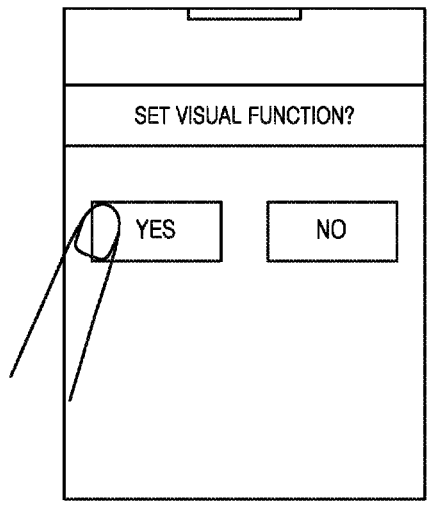
FIGS. 3A to 3D are screens illustrating a process of setting a visual function according to an exemplary embodiment of the present invention.
Figure 3B:
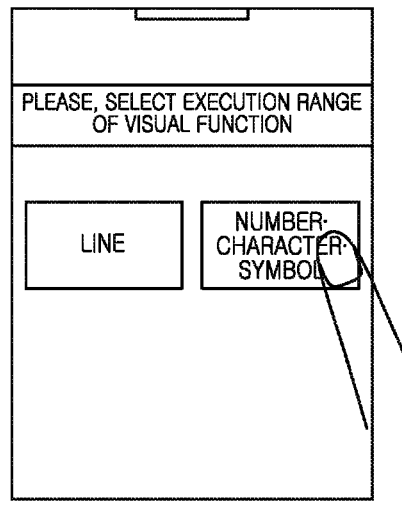

Referring to FIGS. 3A to 3D, an electronic device displays a message about whether to set a visual function through a certain process. As shown in FIG. 3A, if a setting of the visual function is received from a user, the electronic device displays messages shown in FIGS. 3B to 3D to receive detailed items of the visual function.

Receiving the setting of the visual function from the user, the electronic device displays a message for allowing the user to select an execution range of the visual function. In accordance with an exemplary embodiment of the present invention, it is assumed that a number, character, symbol is received as the execution range of the visual function. In more detail, when the number, character, and symbol is received as the execution range of the visual function, if a touch input is received from the user, the electronic device searches a blank space between any one of the nearest numbers, characters, and symbols from a center coordinate of a touch region. That is, when the execution range of the visual function is set to the number, character, and symbol, the electronic device searches a blank space between any one of the nearest numbers, characters, and symbols composing text from a coordinate center of a touch region and inserts a set transparent layer into the corresponding space. As shown in FIG. 3D, if the number, character, and symbol is received as the execution range of the visual function from the user, the electronic device displays a message shown in FIG. 3C to receive a length of the transparent layer.

Figure 3C:
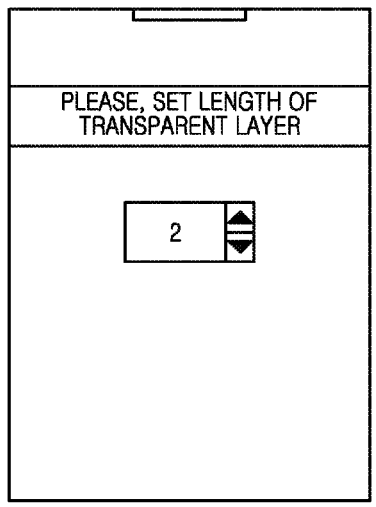
Figure 3D:
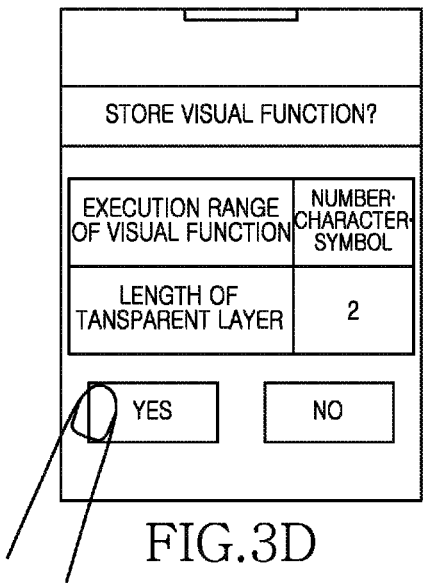

Receiving the execution range of the visual function from the user, the electronic device displays, as shown in FIG. 3C, a message for allowing the user to set a length of the transparent layer. Herein, the transparent layer may be defined as a blank space inserted into a touch region. In more detail, when the execution range of the visual function is set to the number, character, and symbol, the transparent layer is inserted between any one of the numbers, characters, and symbols composing text and divides any one of the numbers, characters, and symbols composing the text by a space of a set transparent layer.

In accordance with an exemplary embodiment of the present invention, because the execution range of the visual function is set to the number, character, and symbol, the electronic device receives a length of the transparent layer from the user. That is, if a long length of the transparent layer is received, the electronic device searches a blank space between any one of the nearest numbers, characters, and symbols from a center coordinate of a touch region and inserts the transparent layer by a set length into the corresponding blank space. Also, if a short length of the transparent layer is received, the electronic device searches a blank space between any one of the nearest numbers, characters, and symbols from a center coordinate of a touch region and inserts the transparent layer by a set length into the corresponding blank space. In conclusion, if a length of the transparent layer is set to a long length, an interval between any one of the numbers, characters, and symbols of a touch region is more broadly increased. If a length of the transparent layer is set to a short length, an interval between any one of the numbers, characters, and symbols of a touch region is more narrowly increased.

Receiving the length of the transparent layer, the electronic device displays a message about whether to store a visual function. As shown in FIG. 3D, the electronic device displays the execution range of the visual function together with the length of the transparent layer which are input from the user such that he or she verifies the input detailed items again before storing the visual function. For example, as shown in FIG. 3D, the electronic device displays that the input execution range of the visual function is the number, character, and symbol and that the input length of the transparent layer is 2 while displaying the message about whether to store the visual function. If a message for indicating that the user wants to store the visual function is received from him or her, the electronic device executes the visual function including the set detailed items.

FIGS. 4A to 4D illustrate a process of adjusting a layout of a screen such that a touch region is not covered according to an exemplary embodiment of the present invention.

FIG. 4A illustrates a process of verifying an input touch region according to an exemplary embodiment of the present invention.

Referring to FIG. 4A, when a touch input of a certain region of a touch screen is received from a user, an electronic device verifies a touch region 401. In more detail, when the touch input of the certain region of the touch screen is received from the user, the electronic device verifies whether text is included in a touch region. Herein, the text may be text included in a webpage and may also be text included in an electronic document. That is, text displayed on the touch screen of the electronic device may include all text.

Hereinafter, in accordance with an exemplary embodiment of the present invention, it is assumed that an execution range of a visual function is set to a line.

If it is verified that the text is included in the input touch region, the electronic device searches a blank space between the nearest lines or any one of the nearest numbers, characters, and symbols from a center coordinate 402 of the touch region according to the execution range of the visual function. As described above, because the execution range of the visual function is set to the line according to an exemplary embodiment of the present invention, the electronic device searches an empty line space between the nearest lines from the center coordinate 402 of the touch region. For example, as shown in FIG. 4A, the electronic device may verify that the center coordinate 402 of the touch region is located between two lines 403 and 404.

FIG. 4B illustrates a process of inserting a transparent layer into an input touch region according to an exemplary embodiment of the present invention.

Referring to FIG. 4B, if it is verified that the text is included in the input touch region, the electronic device inserts a set transparent layer 405 into the empty line space between the nearest lines from the center coordinate of the touch region. In more detail, if the electronic device inserts the set transparent layer 405 into the empty line space between the nearest lines from the center coordinate of the touch region, text displayed on the touch screen is divided into two portions based on the transparent layer 405. A height of the transparent layer 405 may be adjusted by a setting of the user. In more detail, if a height of the transparent layer 405 is set to a high height, an interval between two lines of the touch region is more broadly increased. If a height of the transparent layer 405 is set to a low height, an interval between two lines of the touch region is more narrowly increased. That is, there is an advantage in that the electronic device inserts the set transparent layer 405 into a touch region such that the text included in the touch region is not covered by a finger, etc. of the user and improves the user's convenience.

FIG. 4C illustrates a process of verifying a position where a touch is ended after scrolling is completed according to an exemplary embodiment of the present invention.

Referring to FIG. 4C, the electronic device verifies a position where a touch is ended after scrolling is completed in a state where the touch region is touched. In more detail, the electronic device compares a position where a touch is ended after scrolling is completed in a state where a certain region is touched on the transparent layer inserted into the touch region with a set position 406. That is, the reason the user touches a certain region on the text displayed on the touch screen is for scrolling the touch screen up, down, left, or right to read text which is not currently displayed on the touch screen.

Accordingly, the electronic device compares the position where the touch is ended with the set position 406 to adjust a layout of a screen. In more detail, if it is determined that the position where the touch is ended is higher than the set position 406, the electronic device deletes the transparent layer inserted into the touch region, shifts a text portion which is located on an upper portion of the transparent layer to a lower side, and combines the shifted text portion with a text portion which is located on a lower portion of the transparent layer. Because the position where the touch is ended after the user scrolls the touch screen is higher than the set position 406 is to read text of a lower portion, the electronic device shifts the text portion which is located on the upper portion of the transparent layer to a lower side and minimizes confusion of a layout of a screen. Also, if it is determined that the position where the touch is ended is lower than the set position 406, the electronic device deletes the transparent layer inserted into the touch region, shifts a text portion which is located on a lower portion of the transparent layer to an upper side, and combines the shifted text portion with a text portion which is located on an upper portion of the transparent layer. Because the position where the touch is ended after the user scrolls the touch screen is lower than the set position 406 is to read text of an upper portion, the electronic device shifts the text portion which is located on the lower portion of the transparent layer to an upper side and minimizes confusion of the layout of the screen.

FIG. 4D illustrates a process of adjusting a layout of a screen according to an exemplary embodiment of the present invention.

Referring to FIG. 4D, because the position where the touch is ended is lower than the set position according to an exemplary embodiment of the present invention, the electronic device deletes the transparent layer inserted into the touch region, shifts a text portion 408 which is located on a lower portion of the transparent layer to an upper side, and combines the shifted text portion with a text portion 407 which is located on an upper portion of the transparent layer. Accordingly, there is an advantage in that the electronic device shifts the text portion 408 which is located on the lower portion of the transparent layer to an upper side such that the user who wants to read text of an upper portion minimizes confusion of a layout of a screen.

FIGS. 5A to 5D illustrate a process of adjusting a layout of a screen such that a touch region is not covered according to an exemplary embodiment of the present invention.

Figure 5A:
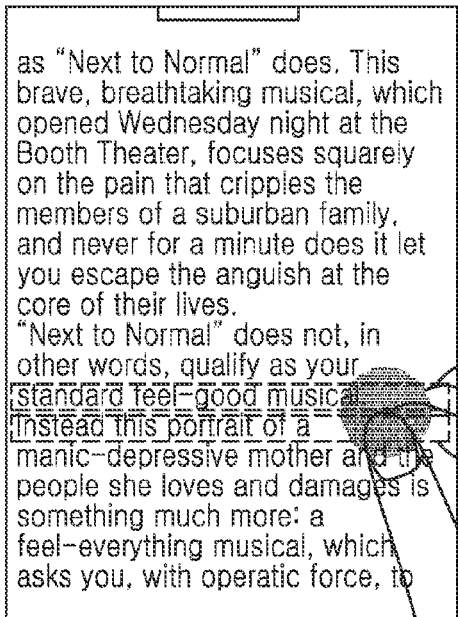
FIGS. 5A to 5D illustrate a process of adjusting a layout of a screen such that a touch region is not covered according to an exemplary embodiment of the present invention.

FIG. 5A illustrates a process of verifying an input touch region according to an exemplary embodiment of the present invention.

Referring to FIG. 5A, when a touch input of a certain region of a touch screen is received from a user, an electronic device verifies a touch region 501. In more detail, when the touch input of the certain region of the touch screen is received from the user, the electronic device verifies whether text is included in a touch region.

Hereinafter, in accordance with an exemplary embodiment of the present invention, it is assumed that an execution range of a visual function is set to a line.

As described above, because the execution range of the visual function is set to the line according to an exemplary embodiment of the present invention, the electronic device searches an empty line space between the nearest lines from a center coordinate 502 of the touch region. For example, as shown in FIG. 5A, the electronic device may verify that the center coordinate 502 of the touch region is located between two lines 503 and 504

Figure 5B:
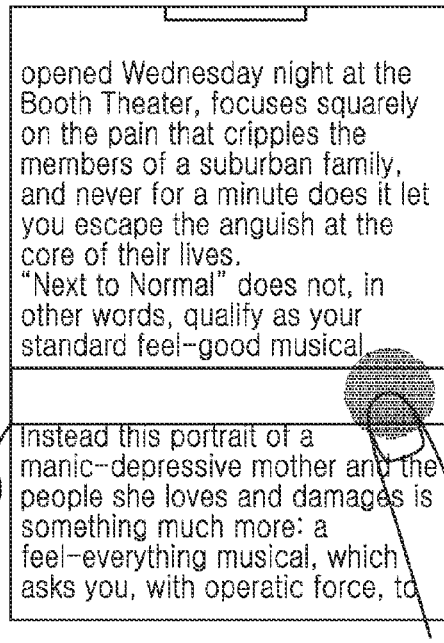

FIG. 5B illustrates a process of inserting a transparent layer into an input touch region according to an exemplary embodiment of the present invention.

Referring to FIG. 5B, if it is verified that the text is included in the input touch region, the electronic device inserts a set transparent layer 505 into the empty line space between the nearest lines from the center coordinate of the touch region. In more detail, if the electronic device inserts the set transparent layer 505 into the empty line space between the nearest lines from the center coordinate of the touch region, text displayed on the touch screen is divided into two portions based on the transparent layer 505. That is, there is an advantage in that the electronic device inserts the set transparent layer 505 into the touch region such that the text included in the touch region is not covered by a finger, etc. of the user and improves the user's convenience.

Figure 5C:
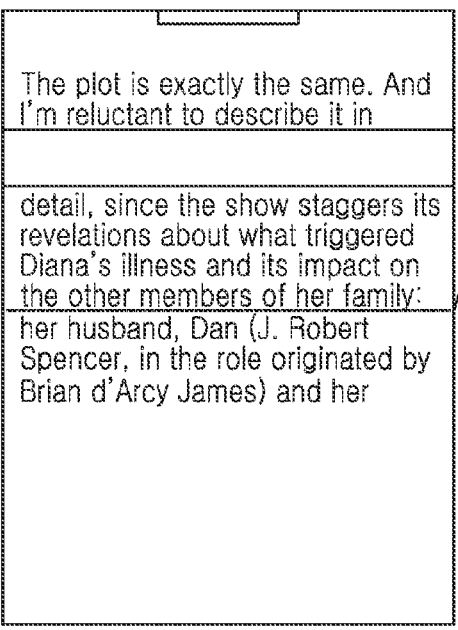

FIG. 5C illustrates a process of verifying a position where a touch is ended after scrolling is completed according to an exemplary embodiment of the present invention.

Referring to FIG. 5C, the electronic device verifies a position where a touch is ended after scrolling is completed in a state where the touch region is touched. In more detail, the electronic device compares a position where a touch is ended after scrolling is completed in a state where a certain region is touched on the transparent layer inserted into the touch region with a set position 506.

Accordingly, the electronic device compares the position where the touch is ended with the set position 506 to adjust a layout of the divided screen. In more detail, if it is determined that the position where the touch is ended is higher than the set position 506, the electronic device deletes the transparent layer inserted into the touch region, shifts a text portion which is located on an upper portion of the transparent layer to a lower side, and combines the shifted text portion with a text portion which is located on a lower portion of the transparent layer. Because the position where the touch is ended after the user scrolls the touch screen is higher than the set position 506 is to read text of a lower portion, the electronic device shifts the text portion which is located on the upper portion of the transparent layer to a lower side and minimizes confusion of a layout of a screen. Also, if it is determined that the position where the touch is ended is lower than the set position 506, the electronic device deletes the transparent layer inserted into the touch region, shifts a text portion which is located on a lower portion of the transparent layer to an upper side, and combines the shifted text portion with a text portion which is located on an upper portion of the transparent layer. Because the position where the touch is ended after the user scrolls the touch screen is lower than the set position 506 is to read text of an upper portion, the electronic device shifts the text portion which is located on the lower portion of the transparent layer to an upper side and minimizes confusion of the layout of the screen.

Figure 5D:

FIG. 5D illustrates a process of adjusting a layout of a screen according to an exemplary embodiment of the present invention.

Referring to FIG. 5D, because the position where the touch is ended is higher than the set position according to an exemplary embodiment of the present invention, the electronic device deletes the transparent layer inserted into the touch region, shifts a text portion 507 which is located on an upper portion of the transparent layer to a lower side, and combines the shifted text portion with a text portion 508 which is located on a lower portion of the transparent layer. Accordingly, there is an advantage in that the electronic device shifts the text portion 507 which is located on the upper portion of the transparent layer to a lower side such that the user who wants to read text of a lower portion minimizes confusion of a layout of a screen.

FIGS. 6A to 6D illustrate a process of adjusting a layout of a screen such that a touch region is not covered according to an exemplary embodiment of the present invention.

Figures 6A, 6B:
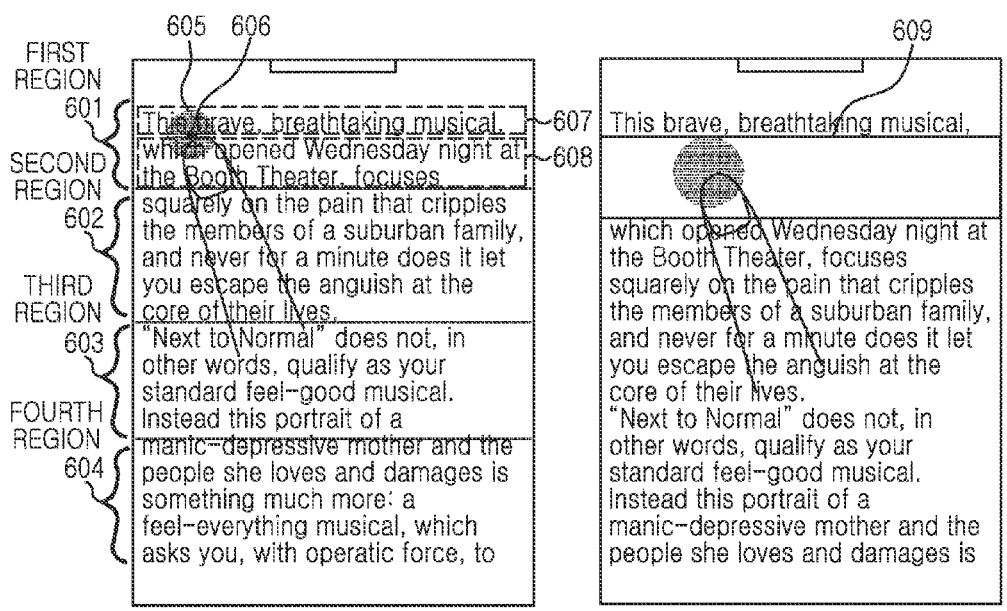
FIGS. 6A to 6D illustrate a process of adjusting a layout of a screen such that a touch region is not covered according to an exemplary embodiment of the present invention.

FIG. 6A illustrates a process of verifying an input touch region according to an exemplary embodiment of the present invention.

Referring to FIG. 6A, when a touch input of a certain region of a touch screen is received from a user, an electronic device verifies whether text is included in a touch region 605. If it is verified that the text is included in the input touch region, the electronic device searches a blank space between the nearest lines or any one of the nearest numbers, characters, and symbols from a center coordinate 606 of the touch region 605 according to an execution range of a visual function. Also, the electronic device according to an exemplary embodiment of the present invention receives the touch input from the user and determines whether the touch region 605 is included in any one of set first to fourth regions 601, 602, 603 and 604. In more detail, when the touch input of the certain region of the touch screen is received from the user, the electronic device searches an empty line space between the nearest lines from the center coordinate 606 of the touch region 605 and determines whether the touch region 605 is included in any one of the set first to fourth regions 601 to 604 simultaneously.

For example, as shown in FIG. 6A, if the execution range of the visual function is set to a line according to an exemplary embodiment of the present invention, the electronic device searches a position between the nearest two lines 607 and 608 from the center coordinate 606 of the touch region 605. The electronic device according to an exemplary embodiment of the present invention verifies that the touch region 605 is included in the first region 601 of the set first to fourth regions 601 to 604. Herein, the set first to fourth regions mean set regions according to descending positions in the order of the first to fourth regions 601 to 604 when horizontally dividing a displayed screen into four portions. That is, in accordance with an exemplary embodiment of the present invention shown in FIG. 6A, the touch screen of the electronic device is divided into four regions. A region of the highest position may be set to the first region 601 and a region under the first region 601 may be set to the second region 602. Also, a region under the second region 603 may be set to the third region 603 and a region of the lowest position may be set to the fourth region 604.

As described above, the reason the touch screen is classified into the four regions according to an exemplary embodiment of the present invention is to have a different height of a transparent layer according to the input touch region. In more detail, the reason the touch screen is classified into the four regions is such that a height of a transparent layer when it is determined that the touch region is included in the set first and fourth regions is higher than a height of a transparent layer when it is determined that the touch region is included in the set second and third regions. That is, the electronic device has a different height of an inserted transparent layer according to the touch-input region to have a different range which is automatically scrolled when performing a layout of a screen. For example, if the touch-input region is included in the first or fourth region, the electronic device inserts a higher transparent layer in comparison with when the touch region is included in the second or third region. Accordingly, there is an advantage in that the electronic device automatically scrolls more text which is not currently displayed on the touch screen to an upper or lower side. If the touch input of the first or fourth region is received, the electronic device according to an exemplary embodiment of the present invention inserts the higher transparent layer in comparison with when the touch input of the second or third region is received. However, if the touch input of the second or third region is received, it is obvious that the electronic device may insert a higher transparent layer into a touch region in comparison with when the touch input of the first or fourth region is received. Also, it is obvious that the electronic device may set a different height of the transparent layer in the order of the first to fourth regions.

FIG. 6B illustrates a process of inserting a transparent layer into an input touch region according to an exemplary embodiment of the present invention.

Referring to FIG. 6B, if it is verified that the text is included in the input touch region, the electronic device inserts a set transparent layer 609 into the empty line space between the nearest lines from the center coordinate of the touch region. At this time, the electronic device verifies that the touch region is included in the set first region and inserts a higher transparent layer in comparison with when the touch input of the second or third region is received. In more detail, if the electronic device inserts the transparent layer 609 of the set height into the empty line space between the nearest lines from the center coordinate of the touch region, text displayed on the touch screen is divided into two portions based on the transparent layer 609. That is, the electronic device inserts the higher transparent layer into the touch region in comparison with when the touch input of the second or third region is received such that an interval in which text is divided into two portions based on the transparent layer is more broadly increased. That is, there is an advantage in that the electronic device inserts the set transparent layer 609 into the touch region such that the text included in the touch region is not covered by a finger, etc. of the user and improves the user's convenience.

Figures 6C, 6D:
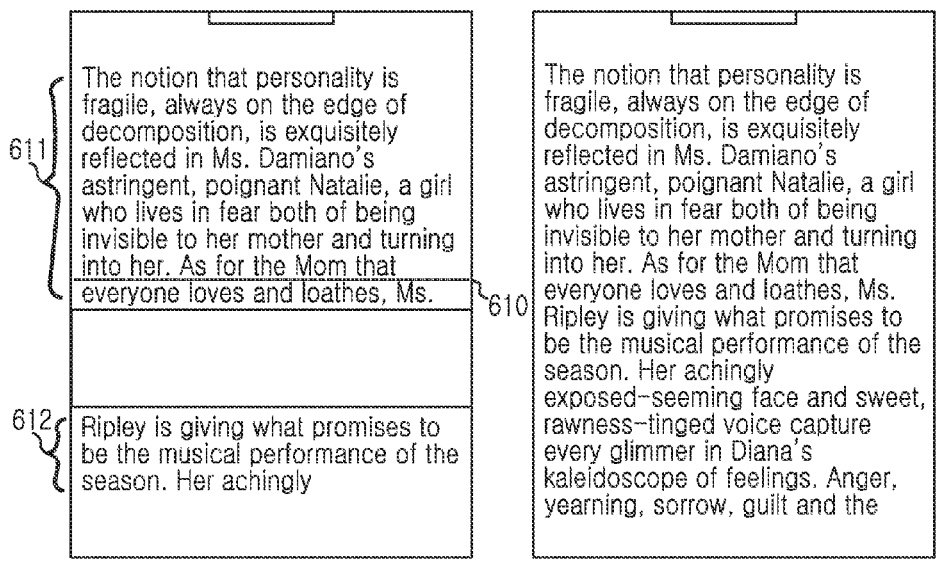

FIG. 6C illustrates a process of verifying a position where a touch is ended after scrolling is completed according to an exemplary embodiment of the present invention.

Referring to FIG. 6C, the electronic device verifies a position where a touch is ended after scrolling is completed in a state where the touch region is touched. In more detail, the electronic device compares a position where a touch is ended after scrolling is completed in a state where the transparent layer inserted into the touch-input first region is touched with a set position 610. Accordingly, the electronic device compares the position where the touch is ended with the set position 610 to adjust a layout of a divided screen. In more detail, if it is determined that the position where the touch is ended is lower than the set position 610, the electronic device deletes the transparent layer inserted into the touch region, shifts a text portion 612 which is located on a lower portion of the transparent layer to an upper side, and combines the shifted text portion with a text portion 611 which is located on an upper portion of the transparent layer. Because the position where the touch is ended after the user scrolls the touch screen is lower than the set position 610 is to read text of an upper portion, the electronic device shifts the text portion which is located on the lower portion of the transparent layer and minimizes confusion of a layout of a screen.

FIG. 6D illustrates a process of adjusting a layout of a screen according to an exemplary embodiment of the present invention.

Referring to FIG. 6D, because the position where the touch is ended is lower than the set position according to an exemplary embodiment of the present invention, the electronic device deletes the transparent layer inserted into the touch region, shifts a text portion which is located on a lower portion of the transparent layer to an upper side, and combines the shifted text portion with a text portion which is located on an upper portion of the transparent layer. Accordingly, there is an advantage in that the electronic device shifts the text portion which is located on the lower portion of the transparent layer to an upper side such that the user who wants to read text of an upper portion minimizes confusion of a layout of a screen.

FIGS. 7A to 7D illustrate a process of adjusting a layout of a screen such that a touch region is not covered according to an exemplary embodiment of the present invention.

FIG. 7A illustrates a process of verifying an input touch region according to an exemplary embodiment of the present invention.

Referring to FIG. 7A, when a touch input of a certain region of a touch screen is received from a user, an electronic device verifies whether text is included in a touch region 705. If it is verified that the text is included in the input touch region, the electronic device searches an empty line space between the nearest lines or any one of the nearest numbers, characters, and symbols from a center coordinate 706 of the touch region 705 according to an execution range of a visual function. Also, the electronic device according to an exemplary embodiment of the present invention receives a touch input from the user and determines whether the touch region 705 is included in any one of set first to fourth regions 701, 702, 703 and 704. In more detail, when the touch input of the certain region of the touch screen is received from the user, the electronic device searches an empty line space between the nearest lines from the center coordinate 706 of the touch region 705 and determines whether the touch region 705 is included in any one of the set first to fourth regions 701 to 704 simultaneously.

For example, as shown in FIG. 7A, if the execution range of the visual function is set to a line according to an exemplary embodiment of the present invention, the electronic device searches a position between the nearest two lines 707 and 708 from the center coordinate 706 of the touch region 705. Also, the electronic device according to an exemplary embodiment of the present invention verifies that the touch region 705 is included in the third region 703 of the set first to fourth regions 701 to 704.

As described above, the reason the touch screen is classified into the four regions according to an exemplary embodiment of the present invention is to have a different height of an inserted transparent layer according to touch-input regions and have a different range which is automatically scrolled when performing a layout of a screen. For example, if a touch-input region is included in the second or third region, the electronic device inserts a lower transparent layer into the touch-input region in comparison with when the touch input of the first or fourth region is received. Accordingly, if the user performs the touch input of the second or third region to read a just upper or lower text which is not displayed on the touch screen, there is an advantage in that the electronic device automatically scrolls just the upper or lower text according to a position where a touch is ended. If the touch input of the second or third region is received, the electronic device according to an exemplary embodiment of the present invention inserts the lower transparent layer into the touch region in comparison with when the touch input of the first or fourth region is received. However, if the touch input of the first or fourth region is received, it is obvious that the electronic device may insert a lower transparent layer into the touch region in comparison with when the touch input of the second or third region is received. Also, it is obvious that the electronic device may set a different height of the transparent layer in the order of the first to fourth regions.

FIG. 7B illustrates a process of inserting a transparent layer into an input touch region according to an exemplary embodiment of the present invention.

Referring to FIG. 7B, if it is verified that the text is included in the input touch region, the electronic device inserts a set transparent layer 709 into the empty line space between the nearest lines from the center coordinate of the touch region. At this time, the electronic device verifies that the touch region is included in the set third region and inserts a lower transparent layer in comparison with when the touch input of the first or fourth region is received. In more detail, if the electronic device inserts the transparent layer 709 of the set height into the empty line space between the nearest lines from the center coordinate of the touch region, text displayed on the touch screen is divided into two portions based on the transparent layer 709. That is, the electronic device inserts the lower transparent layer into the touch region in comparison with when the touch input of the first or fourth region is received such that an interval in which text is divided into two portions based on the transparent layer is more narrowly increased. That is, there is an advantage in that the electronic device inserts the set transparent layer 709 into the touch region such that the text included in the touch region is not covered by a finger, etc. of the user and improves the user's convenience.

FIG. 7C illustrates a process of verifying a position where a touch is ended after scrolling is completed according to an exemplary embodiment of the present invention.

Referring to FIG. 7C, the electronic device verifies a position where a touch is ended after scrolling is completed in a state where the touch region is touched. In more detail, the electronic device compares a position where a touch is ended after scrolling is completed in a state where the transparent layer inserted into the touch-input third region is touched with a set position 710. In more detail, if it is determined that the position where the touch is ended is higher than the set position 710, the electronic device deletes the transparent layer inserted into the touch region, shifts a text portion 711 which is located on an upper portion of the transparent layer to an upper side, and combines the shifted text portion with a text portion 712 which is located on a lower portion of the transparent layer. Because the position where the touch is ended after the user scrolls the touch screen is higher than the set position 710 is to read text of a lower portion, the electronic device shifts the text portion 711 which is located on the upper portion of the transparent layer to a lower side and minimizes confusion of a layout of a screen.

FIG. 7D illustrates a process of adjusting a layout of a screen according to an exemplary embodiment of the present invention.

Referring to FIG. 7D, because the position where the touch is ended is higher than the set position according to an exemplary embodiment of the present invention, the electronic device deletes the transparent layer inserted into the touch region, shifts a text portion which is located on an upper portion of the transparent layer to a lower side, and combines the shifted text portion with a text portion which is located on a lower portion of the transparent layer. Accordingly, there is an advantage in that the electronic device shifts the text portion which is located on the upper portion of the transparent layer to a lower side such that the user who wants to read text of a lower portion minimizes confusion of a layout of a screen.

FIGS. 8A to 8D illustrate a process of adjusting a layout of a screen such that a touch region is not covered according to an exemplary embodiment of the present invention.

FIG. 8A illustrates a process of verifying an input touch region according to an exemplary embodiment of the present invention.

Referring to FIG. 8A, when a user performs a touch input of a certain region of a touch screen while reading text displayed on the touch screen of an electronic device, the electronic device verifies a touch region 801. In more detail, when the touch input of the certain region of the touch screen is received from the user, the electronic device determines whether text is included in the touch-input touch region 801. If it is determined that the text is included in the touch region 801 which receives the touch input from the user, the electronic device searches the nearest blank space from a center coordinate 802 of the touch region 801. In accordance with an exemplary embodiment of the present invention, it is assumed that an execution range of a visual function is set to a number, character, and symbol composing text. Accordingly, the electronic device searches a blank space between any one of the nearest numbers, characters, and symbols composing the text from the center coordinate 802 of the touch region 801. For example, as shown in FIG. 8A, the electronic device may verify that the center coordinate 802 of the touch region 801 is located between characters and which are included in a line 803.

FIG. 8B illustrates a process of inserting a transparent layer into an input touch region according to an exemplary embodiment of the present invention.

Referring to FIG. 8B, if it is verified that the text is included in the input touch region, the electronic device inserts a set transparent layer 804 into the blank space between any one of the nearest numbers, characters, and symbols from the center coordinate of the touch region. In more detail, if the electronic device inserts the set transparent layer 804 into the blank space between any one of the nearest numbers, characters, and symbols from the center coordinate of the touch region, any one of numbers, characters, and symbols of text displayed on the touch screen are divided into two portions based on the transparent layer 804. Herein, a length of the transparent layer 804 may be adjusted by a setting of the user. In more detail, if a length of the transparent layer 804 is set to a long length, an interval between any one of numbers, characters, and symbols of the touch region is more broadly increased. If a length of the transparent layer 804 is set to a short length, an interval between any one of numbers, characters, and symbols of the touch region is more narrowly increased. That is, there is an advantage in that the electronic device inserts the set transparent layer 804 into the touch region such that the text included in the touch region is not covered by a finger, etc. of the user and improves the user's convenience.

FIG. 8C illustrates a process of receiving a touch input on a new region and proceeding with scrolling according to an exemplary embodiment of the present invention.

Referring to FIG. 8C, the electronic device may receive a touch input on a new region in a state where the touch region is touched and may proceed with scrolling. In more detail, the electronic device may receive the touch input on the new region while proceeding with scrolling after the touch input is received for the first time, and may insert a new transparent layer into any one of numbers, characters, and symbols. That is, the user may get out of a touch region which is input for the first time while reading text displayed on the touch screen and may scroll a new region. For example, the electronic device verifies that a center coordinate of an initial touch region is located between characters and inserts the transparent layer between the corresponding characters. The electronic device verifies that a center coordinate of a new touch region is between characters, deletes a previous transparent layer, and inserts a new transparent layer 805 between the corresponding characters. Accordingly, when the touch input of the new region is received from the user, the electronic device repeatedly performs a process of inserting a set transparent layer into a blank space between any one of the nearest numbers, characters, and symbols from the center coordinate of the touch region.

FIG. 8D illustrates a process of adjusting a layout of a screen according to an exemplary embodiment of the present invention.

Referring to FIG. 8D, if it is verified that the touch input is ended, the electronic device deletes the transparent layer inserted into the blank space between any one of the nearest numbers, characters, and symbols from the center coordinate of the touch region and adjusts a layout of a screen. There is an advantage in that the electronic device allows the user to read a text portion which is covered by a finger, etc. of the user flexibly by reflecting a changed touch region.

Figure 9:
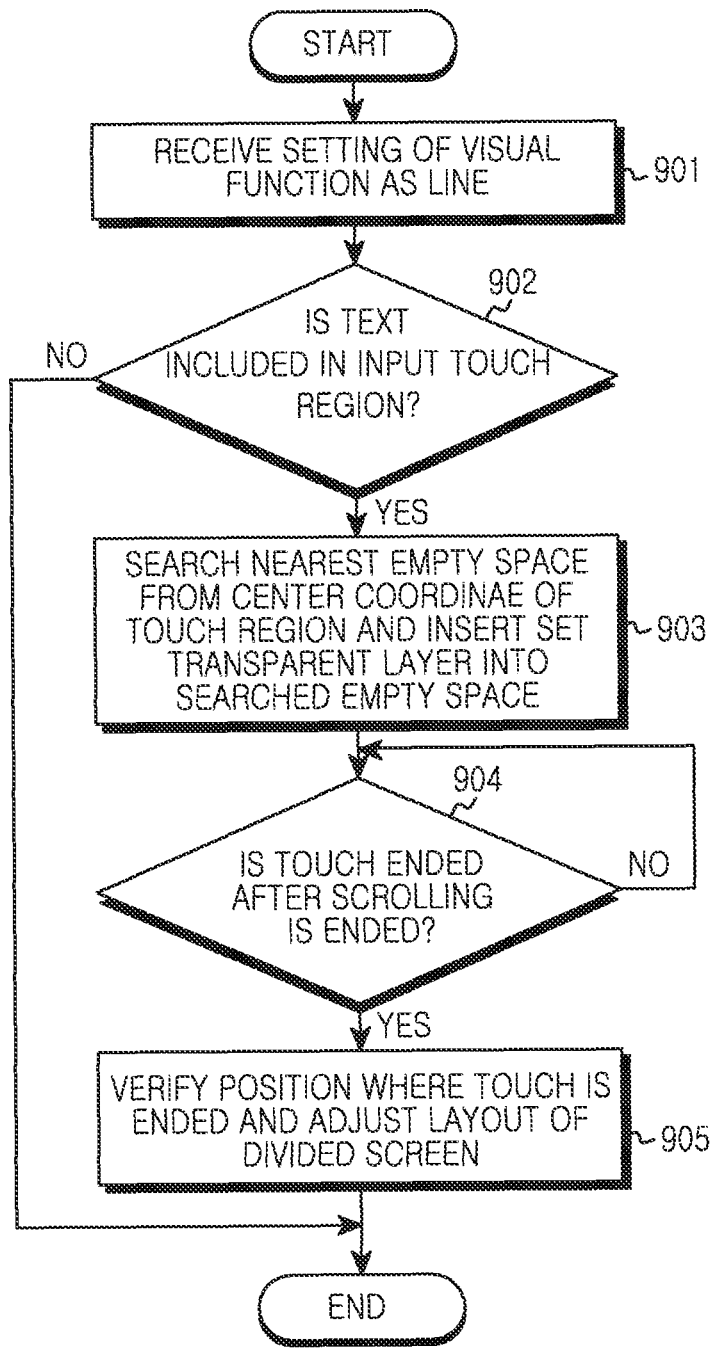
FIG. 9 is a flowchart illustrating an operating method of an electronic device when a visual setup range is set to a line according to an exemplary embodiment of the present invention.

FIG. 9 is a flowchart illustrating an operating method of an electronic device when a visual setup range is set to a line according to an exemplary embodiment of the present invention.

Referring to FIG. 9, the electronic device receives a setting of a visual function as a line in step 901. In more detail, an execution range of the visual function may be a line composing text and may also be any one of a number, character, and symbol composing text. That is, it is assumed that the execution range of the visual function is set to the line composing text according to an exemplary embodiment of the present invention. The electronic device searches an empty line space between the nearest lines composing text from a center coordinate of a touch region.

The electronic device determines whether text is included in the input touch region in step 902. In more detail, the electronic device according to an exemplary embodiment of the present invention allows a user to see a portion covered by a finger, etc. of the user, which is used for touch input, on text displayed on a touch screen. The electronic device determines whether the text is included in the input touch region. Herein, the text may be text included in a webpage and may also be text included in an electronic document. That is, text displayed on the touch screen of the electronic device may include all text.

If it is determined that the text is included in the input touch region, the electronic device searches the nearest empty line space from a center coordinate of the touch region and inserts a set transparent layer into the searched empty line space in step 903. In more detail, if the electronic device inserts the set transparent layer into the empty line space between the nearest lines from the center coordinate of the touch region, text displayed on the touch screen is divided into two portions based on the transparent layer. Herein, a height of the transparent layer may be adjusted by a setting of the user. In more detail, if a height of the transparent layer is set to a high height, an interval between two lines of the touch region is more broadly increased. If a height of the transparent layer is set to a low height, an interval between two lines of the touch region is more narrowly increased. That is, there is an advantage in that the electronic device inserts the set transparent layer into the touch region such that the text included in the touch region is not covered by a finger, etc. of the user and improves the user's convenience.

Searching the nearest empty line space from the center coordinate of the touch region and inserting the set transparent layer into the searched empty line space, the electronic device determines whether a touch is ended after scrolling is completed in step 904. In more detail, the electronic device compares a position where the touch is ended after the scrolling is completed in a state where a certain region is touched on the transparent layer inserted into the touch region with a set position. That is, the reason the user touches a certain region on the text displayed on the touch screen is for scrolling the touch screen up, down, left, or right to read text which is not currently displayed on the touch screen.

If it is determined that the touch is ended after the scrolling is completed, the electronic device verifies the position where the touch is ended and adjusts a layout of a divided screen in step 905. In more detail, if it is determined that the position where the touch is ended is higher than the set position, the electronic device deletes the transparent layer inserted into the touch region, shifts a text portion which is located on an upper portion of the transparent layer to a lower side, and combines the shifted text portion with a text portion which is located on a lower portion of the transparent layer. Because the position where the touch is ended after the user scrolls the touch screen is higher than the set position is to read text of a lower portion, the electronic device shifts the text portion which is located on the upper portion of the transparent layer to a lower side and minimizes confusion of a layout of a screen. Also, if it is determined that the position where the touch is ended is lower than the set position, the electronic device deletes the transparent layer inserted into the touch region, shifts a text portion which is located on a lower portion of the transparent layer to an upper side, and combines the shifted text portion with a text portion which is located on an upper portion of the transparent layer. Because the position where the touch is ended after the user scrolls the touch screen is lower than the set position is to read text of an upper portion, the electronic device shifts the text portion which is located on the lower portion of the transparent layer to an upper side and minimizes confusion of the layout of the screen.

If it is determined that the text is not included in the input touch region in step 902, it is obvious that the operation of the electronic device is ended. If it is determined that the touch is not ended after the scrolling is completed in step 904, it is obvious that the electronic device repeats the process of verifying that the touch is ended.

Figure 10:
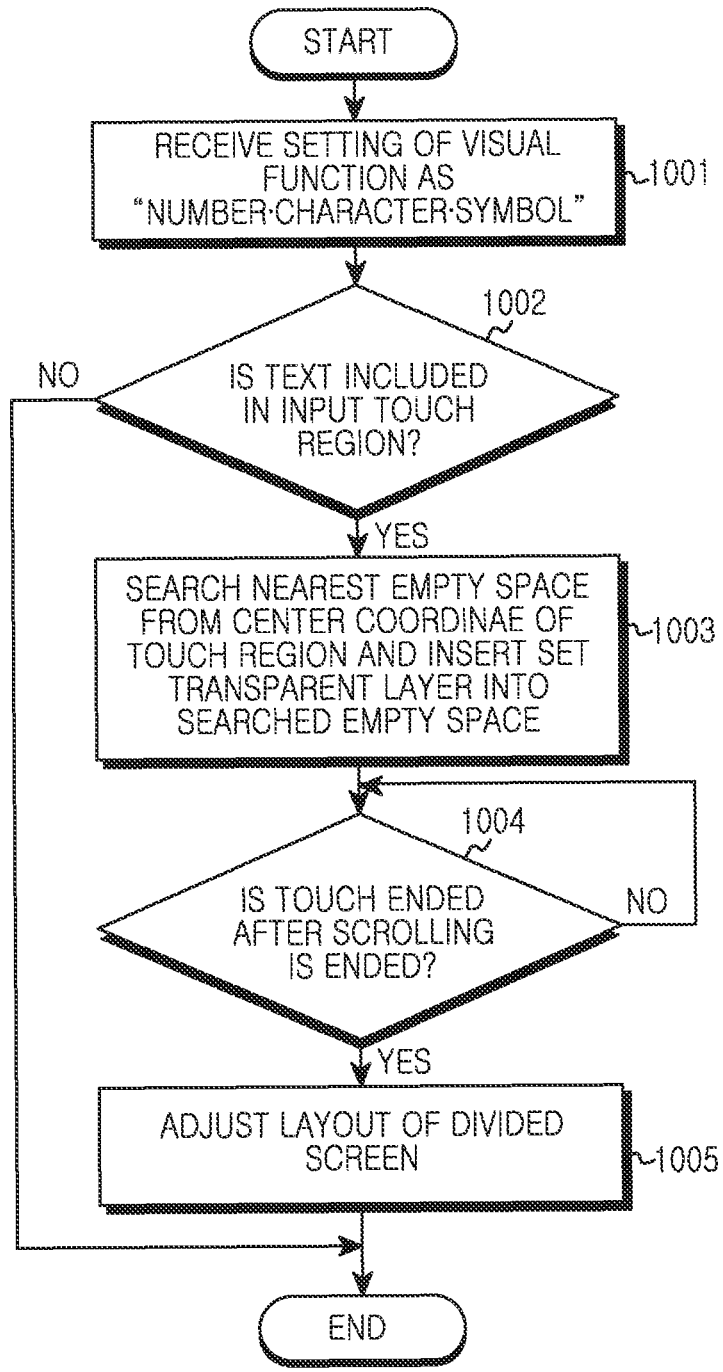
FIG. 10 is a flowchart illustrating an operating method of an electronic device when a visual setup range is set to a number, character, and symbol according to an exemplary embodiment of the present invention.

FIG. 10 is a flowchart illustrating an operating method of an electronic device when a visual setup range is set to a number, character, and symbol according to an exemplary embodiment of the present invention.

Referring to FIG. 10, the electronic device receives a setting of a visual function as a number, character, and symbol in step 1001. In more detail, an execution range of the visual function may be a line composing text and may also be any one of a number, character, and symbol composing text. That is, it is assumed that the execution range of the visual function is set to the number, character, and symbol composing text according to an exemplary embodiment of the present invention. The electronic device searches a blank space between any one of the nearest numbers, characters, and symbols composing text from a center coordinate of a touch region.

The electronic device determines whether text is included in the input touch region in step 1002. In more detail, the electronic device according to an exemplary embodiment of the present invention allows a user to see a portion covered by a finger, etc. of the user, which is used for touch input, on text displayed on a touch screen. The electronic device determines whether the text is included in the input touch region. Herein, the text may be text included in a webpage and may also be text included in an electronic document. That is, text displayed on the touch screen of the electronic device may include all text.

If it is determined that the text is included in the input touch region, the electronic device searches the nearest empty line space from a center coordinate of the touch region and inserts a set transparent layer into the searched empty line space in step 1003. In more detail, if the electronic device inserts the set transparent layer into the blank space between the nearest numbers, characters, and symbols from the center coordinate of the touch region, text displayed on the touch screen is divided into two portions based on the transparent layer. Herein, a length of the transparent layer may be adjusted by a setting of the user. In more detail, if a length of the transparent layer is set to a long length, an interval between any one of numbers, characters, and symbols of the touch region is more broadly increased. If a length of the transparent layer is set to a short length, an interval between any one of numbers, characters, and symbols of the touch region is more narrowly increased. That is, there is an advantage in that the electronic device inserts the set transparent layer into the touch region such that the text included in the touch region is not covered by a finger, etc. of the user and improves the user's convenience.

Searching the nearest empty line space from the center coordinate of the touch region and inserting the set transparent layer into the searched empty line space, the electronic device determines whether a touch is ended after scrolling is completed in step 1004. In more detail, the electronic device may receive a touch input on a new region while proceeding with scrolling after the touch input is received for the first time, and may insert a new transparent layer into any one of numbers, characters, and symbols. That is, the user may get out of a touch region which is input for the first time while reading text displayed on the touch screen and may scroll a new region. Accordingly, when a touch input of the new region is received from the user, the electronic device repeats the process of inserting the set transparent layer into the blank space between any one of the nearest numbers, characters, and symbols from the center coordinate of the touch region.

Verifying that the touch is ended after the scrolling is completed, the electronic device adjusts a layout of a divided screen in step 1005. If it is verified that the touch input is ended, the electronic device deletes the transparent layer inserted into the blank space between any one of the nearest numbers, characters, and symbols from the center coordinate of the touch region and adjusts a layout of a screen. That is, there is an advantage in that the electronic device allows the user to read a text portion which is covered by a finger, etc. of the user flexibly by reflecting a changed touch region.

Figure 11:
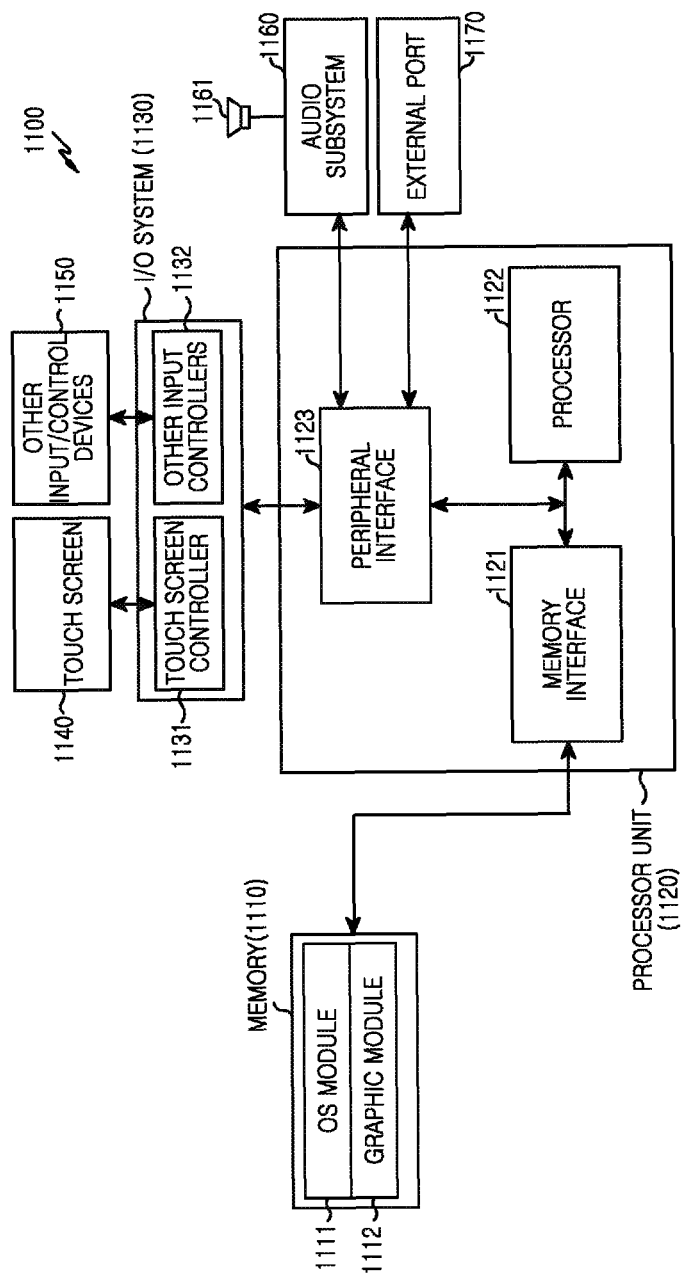
FIG. 11 is a block diagram illustrating a configuration of an electronic device according to an exemplary embodiment of the present invention.

FIG. 11 is a block diagram illustrating a configuration of an electronic device according to an exemplary embodiment of the present invention.

Referring to FIG. 11, the electronic device, denoted by 1100, may be a portable electronic device. The electronic device 1100 may be any one of several apparatuses such as a portable terminal, a mobile phone, a mobile pad, a media player, a tablet computer, a handheld computer, a Personal Digital Assistant (PDA), and the like. Also, the electronic device may be a certain portable electronic device including a device in which two or more functions are combined among these apparatuses.

The electronic device 1100 may include a memory 1110, a processor unit 1120, an Input/Output (I/O) system 1130, a touch screen 1140, other input control devices 1150, an audio subsystem 1160, and an external port 1170.

The processor unit 1120 may include a memory interface 1121, at least one or more processors 1122, and a peripheral interface 1123. In some cases, the entire processor unit 1120 is referred to as a processor. The processor unit 1120 according to an exemplary embodiment of the present invention verifies an input touch region, adjusts a layout of a screen such that the touch region is not covered, and verifies that at least one of text, an image, and a media player is included in the touch region. Also, the processor 1120 verifies a center coordinate of a touch region including text, searches the nearest empty line space from the verified center coordinate, inserts a set transparent layer into the searched empty line space, and divides text displayed on a screen based on the transparent layer. Also, the processor unit 1120 inserts a transparent layer between lines composing text such that the text is moved and divided into two portions such as an upper portion and a lower portion based on the transparent layer. Also, the processor unit 1120 inserts a transparent layer between any one of numbers, characters, and symbols composing text such that any one of the numbers, characters, and symbols composing text are moved and divided by a space of a set transparent layer. Also, the processor unit 1120 verifies a position where a touch is ended after a screen is scrolled, verifies that a certain portion is touched on a transparent layer inserted into a touch region, verifies that scrolling is completed in a state where the certain portion is touched, and verifies the position where the touch is ended. Also, the processor unit 1120 adjusts a layout of a divided screen, verifies that a position where a touch is ended is higher than a set position, deletes a transparent layer inserted into a touch region, shifts a text portion which is located on an upper portion of the transparent layer to a lower side, and combines the shifted text portion with a text portion which is located on a lower portion of the transparent layer. Also, the processor unit 1120 verifies that a position where a touch is ended is lower than a set position, deletes an inserted transparent layer, shifts a text portion which is located on a lower portion of the transparent layer to an upper side, and combines the shifted text portion with a text portion which is located on an upper portion of the transparent layer. Also, the processor unit 1120 deletes an inserted transparent layer and combines any one of numbers, characters, and symbols which are located on left and right portions of the transparent layer with each other. Also, the processor unit 1120 verifies a center coordinate of a touch region including an image or a media player, verifies that the verified center coordinate is higher than a set position, and moves the entire image or media player to a lower portion of the touch region and displays the moved image or media player such that the media or media player included in the touch region is not covered. Also, the processor unit 1120 verifies a center coordinate of a touch region including an image or a media player, verifies that the verified center coordinate is lower than a set position, and moves the entire image or media player included in the touch region to an upper portion of the touch region and displays the moved image or media player such that the image or media player included in the touch region is not covered.

The processor 1122 executes several software programs and performs several functions for the electronic device 100. Also, the processor 1122 performs process and control for voice communication and data communication. Also, in addition to this normal function, the processor 1122 plays a role in executing a specific software module (e.g., instruction set) stored in the memory 1110 and performing several specific functions corresponding to the specific software module. That is, the processor 1122 interworks with software modules stored in the memory 1110 and the processor performs a method according to an exemplary embodiment of the present invention.

The processor 1122 may include one or more data processors, an image processor, a codec. etc. The processor 1122 may separately include the data processors, the image processor, the codec, etc. or may include several processors for performing different functions. The peripheral interface 1123 connects the I/O system 1130 of the electronic device 1100 with the memory 1110 (though the memory interface 1121).

A variety of components of the electronic device 1100 may be coupled by one or more communication buses (not written in reference numbers) or stream lines (not written in reference numbers).

The external port 1170 is used to connect a portable electronic device (not shown) to another electronic device directly or connect it to another electronic device indirectly through a network (e.g., the Internet, an intranet, a wireless Local Area Network (LAN), etc.). For example, the external port 1170 may include, but is not limited to, a Universal Serial Bus (USB) port, a firewire port, etc.

The audio subsystem 1160 may connect to a speaker 1161 and may be responsible for inputting and outputting an audio stream, such as a voice recognition function, a voice copy function, a digital recording function, and a phone call function. That is, the audio subsystem 1160 communicates with a user through the speaker 1161. The audio subsystem 1160 receives a data stream through the peripheral interface 1123 of the processor unit 1120 and converts the received data stream into an electric stream. The converted electric stream is transmitted to the speaker 1161. The speaker 1161 converts the electric stream into a sound wave to which the user may listen and outputs the converted sound wave. The audio subsystem 1160 converts a received electric stream into an audio data stream and transmits the converted audio data stream to the peripheral interface 1123. The audio subsystem 1160 may include an attachable and detachable earphone, headphone, headset, etc.

The I/O system 1130 may include a touch screen controller 1131 and/or other input controllers 1132. The touch screen controller 1131 may be coupled to the touch screen 1140. The touch screen 1140 and the touch screen controller 1131 may detect, but are not limited to, contact and motion or a stop of either of them using not only capacitive, resistive, infrared ray, and surface acoustic wave technologies for determining one or more contact points with the touch screen 1140 but also a certain multi-touch sensing technology including another proximity sensor arrangement or other elements. The other input controllers 1132 may be coupled to the other input/control devices 1150. The other input/control devices 1150 may be pointer devices such as one or more buttons, a rocket switch, a thumb-wheel, a dial, a stick, and/or a stylus.

The touch screen 1140 provides an input/output interface between the electronic device 1100 and the user. That is, the touch screen 1140 transmits a touch input of the user to the electronic device 1100. Also, the touch screen 1140 is a medium for displaying output from the electronic device 1100 to the user. That is, the touch screen 1140 displays visual output to the user. This visual output has a text type, a graphic type, a video type, and a combined type of them.

The touch screen 1140 may be several displays. For example, the touch screen 1140 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The memory 1110 may be coupled to the memory interface 1121. The memory 1110 may include a high-speed Random Access Memory (RAM) such as one or more magnetic storages, a non-volatile memory, one or more optical storages, and/or a flash memory (e.g., a NAND flash memory or a NOR flash memory).

The memory 1110 stores software components. The software components include an Operating System (OS) module 1111, a graphic module 1112, etc. Also, the modules which are the software components may be expressed in a set of instructions. Accordingly, the modules are expressed in an instruction set. Also, the modules may be expressed in programs. The memory 1110 according to an exemplary embodiment of the present invention stores electronic contents together with at least one input indication, stores a moving picture of an extracted interval, stores electronic contents together with an input highlight indication, generates a highlight list, calls a stored highlight list, calls a stored drawing list, etc. The OS module 1111 (e.g., embedded OS such as Windows, Linux, Darwin, RTXC, UNIX, OS X, or VxWorks) includes several software components for controlling a general system operation. For example, control of this general system operation means memory management and control, storage hardware (device) control and management, power control and management, etc. This OS module 1111 also performs a function for smoothly communicating between several hardware components (devices) and software components (modules).

The graphic module 1112 includes several software components for providing and displaying graphics on the touch screen 1140. The term "graphics" means that text, web pages, icons, digital images, videos, animations, etc. are included. The touch screen 1140 according to an exemplary embodiment of the present invention displays a message about whether to set a smart rotation function and allows the user to select a certain region included in the message.

A variety of functions of the electronic device 1100, which are described above or to be described later, may be executed by one or more streaming processing, hardware including an Application Specific Integrated Circuit (ASIC), software, and/or combination of them.

FIGS. 12A to 12D are screens illustrating a process of adjusting a layout such that an image included in a touch region is not covered according to an exemplary embodiment of the present invention.

Figure 12A:
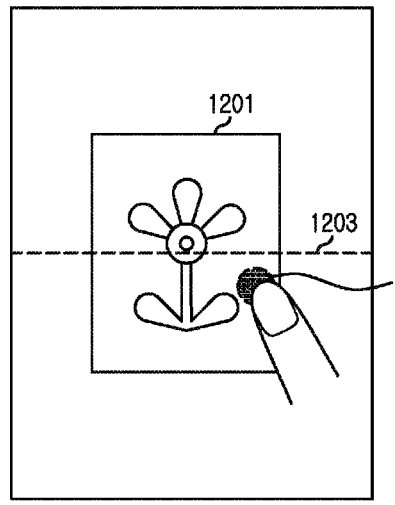
FIGS. 12A to 12D are screens illustrating a process of adjusting a layout of a screen such that an image included in a touch region is not covered according to an exemplary embodiment of the present invention.

FIG. 12A illustrates a screen when a center coordinate of a touch region is lower than a set position according to an exemplary embodiment of the present invention.

Referring to FIG. 12A, when an image 1201 is displayed on a touch screen of an electronic device, it is assumed that the electronic device receives a touch input of any one region of the image 1201 from a user. First of all, the electronic device determines whether a region which receives the touch input from the user is higher or lower than a set position 1203. In more detail, when a touch input of any one region on the image 1201 displayed on the touch screen is received, the electronic device determines whether a center coordinate of the touch-input region 1202 is higher or lower than the set position 1203. In accordance with an exemplary embodiment of the present invention, because the center coordinate of the touch region 1202 is lower than the set position 1203, the electronic device may verify that the center coordinate of the touch region 1202 is lower than the set position 1203.

Figure 12B:
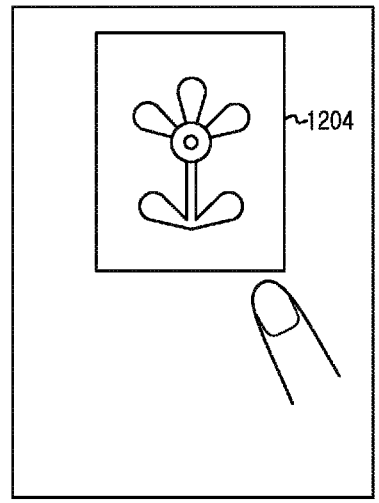

FIG. 12B is a screen illustrating a process of moving the entire image to an upper side of a touch region and displaying the moved image such that an image included in a touch is not covered according to an exemplary embodiment of the present invention.

Referring to FIG. 12B, if it is determined that the center coordinate of the touch region is lower than a set position, the electronic device moves the entire image 1204 to an upper side of the touch region and displays the image 1204 such that the image included in the touch region is not covered by the touch input. That is, if it is determined that the image is included in the region which receives the touch input from the user and it is determined that the touch-input region is lower than the set position, the electronic device may move the entire image 1204 to the upper side of the touch region and may display the image 1204 such that the image is not covered by the touch input. An electronic device of the related art does not provide a method of addressing a problem in that an image is covered by an input means although a touch input is received on an image displayed on a touch screen. However, if it is determined that the image is included in the touch region which receives the touch input from the user, the electronic device according to an exemplary embodiment of the present invention may move the image to an upper or lower side of the touch region such that the image is not covered by the touch input. Accordingly, although the user performs a touch input on the image displayed on the touch screen, because the image is not covered by an input means of the user, there is an advantage in that the electronic device improves the user's convenience.

Figure 12C:
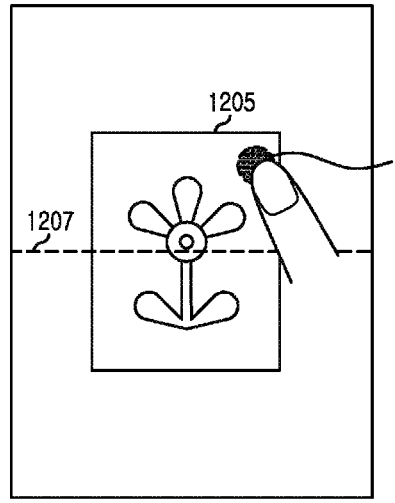

FIG. 12C illustrates a screen when a center coordinate of a touch region is higher than a set position according to an exemplary embodiment of the present invention.

Referring to FIG. 12C, when an image 1205 is displayed on a touch screen of the electronic device, it is assumed that the electronic device receives a touch input of any one region of the image 1205 from the user. First of all, the electronic device determines whether a region 1206 which receives the touch input from the user is higher or lower than a set position 1207. In more detail, when a touch input of any one region on the image 1205 displayed on the touch screen is received, the electronic device determines whether a center coordinate of the touch-input region 1206 is higher or lower than the set position 1207. In accordance with an exemplary embodiment of the present invention, because the center coordinate of the touch region 1206 is higher than the set position 1207, the electronic device may verify that the center coordinate of the touch region 1206 is higher than the set position 1207.

Figure 12D:
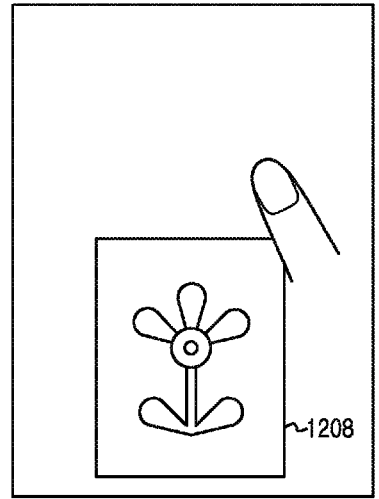

FIG. 12D is a screen illustrating a process of moving the entire image to a lower side of a touch region and displaying the moved image such that an image included in a touch region is not covered according to an exemplary embodiment of the present invention.

Referring to FIG. 12D, if it is determined that the center coordinate of the touch region is higher than the set position, the electronic device moves the entire image 1208 to a lower side of the touch region and displays the image 1208 such that the image included in the touch region is not covered by a touch input. That is, if it is determined that the image is included in the region which receives the touch input from the user and it is determined that the touch-input region is higher than the set position, the electronic device may move the entire image 1208 to the lower side of the touch region and may display the image 1208 such that the image is not covered by the touch input. An electronic device of the related art does not provide a method of addressing a problem in that an image is covered by an input means although a touch input is received on an image displayed on a touch screen. However, if it is determined that the image is included in the touch region which receives the touch input from the user, the electronic device according to an exemplary embodiment of the present invention may move the image to an upper or lower side of the touch region such that the image is not covered by the touch input. Accordingly, although the user performs a touch input on the image displayed on the touch screen, because the image is not covered by an input means of him or her, there is an advantage in that the electronic device improves the user's convenience.

FIGS. 13A to 13D are screens illustrating a process of adjusting a layout of a screen such that a media player included in a touch region is not covered according to an exemplary embodiment of the present invention.

Figure 13A:
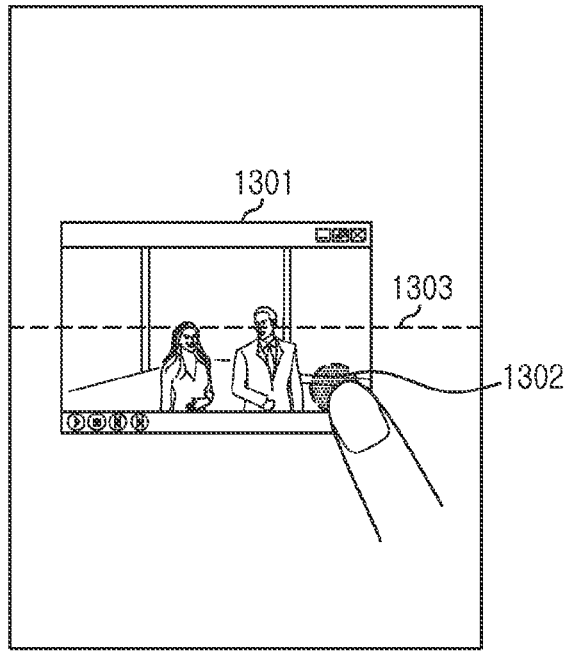
FIGS. 13A to 13D are screens illustrating a process of adjusting a layout of a screen such that a media player included in a touch region is not covered according to an exemplary embodiment of the present invention.

FIG. 13A illustrates a screen when a center coordinate of a touch region is lower than a set position according to an exemplary embodiment of the present invention.

Referring to FIG. 13A, when a media player 1301 is displayed on a touch screen of an electronic device, it is assumed that the electronic device receives a touch input of any one region of the media player 1301 from a user. First of all, the electronic device determines whether a region 1302 which receives the touch input from the user is higher or lower than a set position 1303. In more detail, when a touch input of any one region on the media player 1301 displayed on the touch screen is received, the electronic device determines whether a center coordinate of the touch-input region 1302 is higher or lower than the set position 1303. In accordance with an exemplary embodiment of the present invention, because the center coordinate of the touch region 1302 is lower than the set position 1303, the electronic device may verify that the center coordinate of the touch region 1302 is lower than the set position 1303.

Figure 13B:
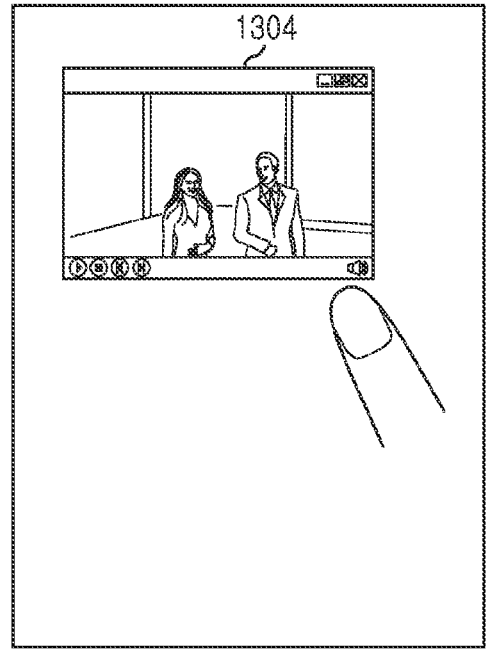

FIG. 13B is a screen illustrating a process of moving the entire image to an upper side of a touch region and displaying the moved image such that a media player included in a touch region is not covered according to an exemplary embodiment of the present invention.

Referring to FIG. 13B, if it is determined that the center coordinate of the touch region is lower than the set position, the electronic device moves the entire media player 1304 to an upper side of the touch region and displays the media player 1304 such that the media player included in the touch region is not covered by the touch input. That is, if it is determined that the media player is included in the region which receives the touch input from the user and it is determined that the touch-input region is lower than the set position, the electronic device may move the entire media player 1304 to the upper side of the touch region and may display the media player 1304 such that the media player is not covered by the touch input. An electronic device of the related art does not provide a method of addressing a problem in that a media player is covered by an input means although a touch input is received on a media player displayed on a touch screen. However, if it is determined that the media player is included in the touch region which receives the touch input from the user, the electronic device according to an exemplary embodiment of the present invention may move the media player to an upper or lower side of the touch region such that the media player is not covered by the touch input. Accordingly, although the user performs a touch input on the media player displayed on the touch screen, because the media player is not covered by an input means of the user, there is an advantage in that the electronic device improves the user's convenience.

Figure 13C:
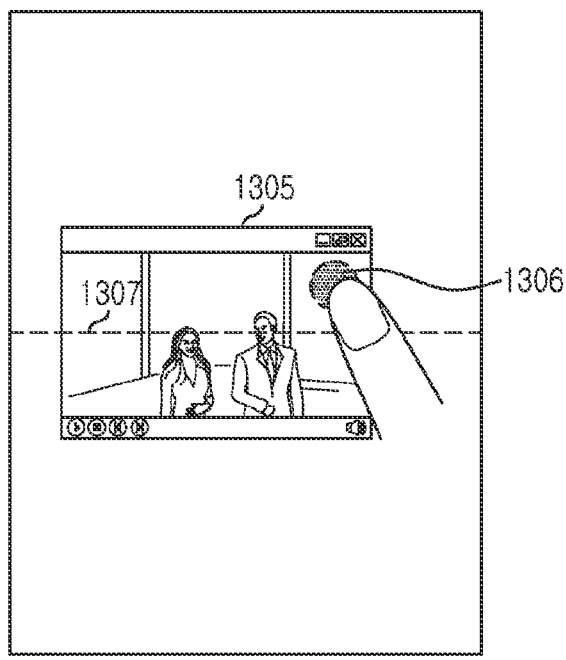

FIG. 13C illustrates a screen when a center coordinate of a touch region is higher than a set position according to an exemplary embodiment of the present invention.

Referring to FIG. 13C, when a media player 1305 is displayed on the touch screen of the electronic device, it is assumed that the electronic device receives a touch input of any one region of the media player 1305 from the user. First of all, the electronic device determines whether a region 1306 which receives the touch input from the user is higher or lower than a set position 1307. In more detail, when a touch input of any one region on the media player 1305 displayed on the touch screen is received, the electronic device determines whether a center coordinate of the touch-input region 1306 is higher or lower than the set position 1307. In accordance with an exemplary embodiment of the present invention, because the center coordinate of the touch region 1306 is higher than the set position 1307, the electronic device may verify that the center coordinate of the touch region 1306 is higher than the set position 1307.

Figure 13D:
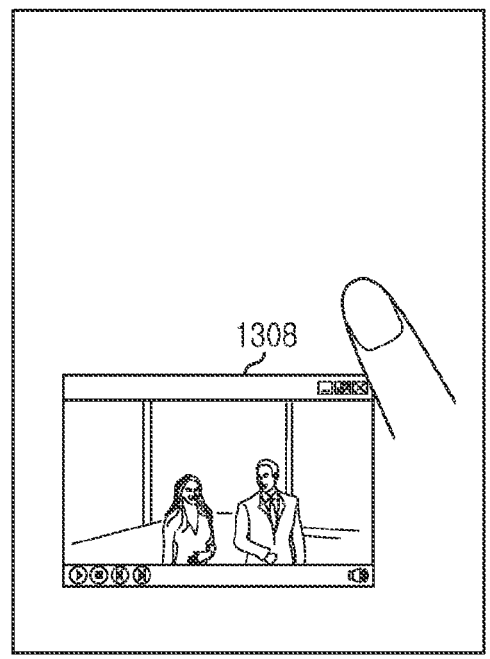

FIG. 13D is a screen illustrating a process of moving the entire image to a lower side of a touch region and displaying the moved image such that a media player included in a touch region is not covered according to an exemplary embodiment of the present invention.

Referring to FIG. 13D, if it is determined that the center coordinate of the touch region is higher than the set position, the electronic device moves the entire media player 1308 to a lower side of the touch region and displays the media player 1308 such that the media player included in the touch region is not covered by a touch input. That is, if it is determined that the media player is included in the region which receives the touch input from the user and it is determined that the touch-input region is higher than the set position, the electronic device may move the entire media player 1308 to the lower side of the touch region and may display the media player 1308 such that the image is not covered by the touch input. An electronic device of the related art does not provide a method of addressing a problem in that a media player is covered by an input means although a touch input is received on a media player displayed on a touch screen. However, if it is determined that the media player is included in the touch region which receives the touch input from the user, the electronic device according to an exemplary embodiment of the present invention may move the media player to an upper or lower side of the touch region such that the media player is not covered by the touch input. Accordingly, although the user performs a touch input on the media player displayed on the touch screen, because the media player is not covered by an input means of the user, there is an advantage in that the electronic device improves the user's convenience.

Figure 14:
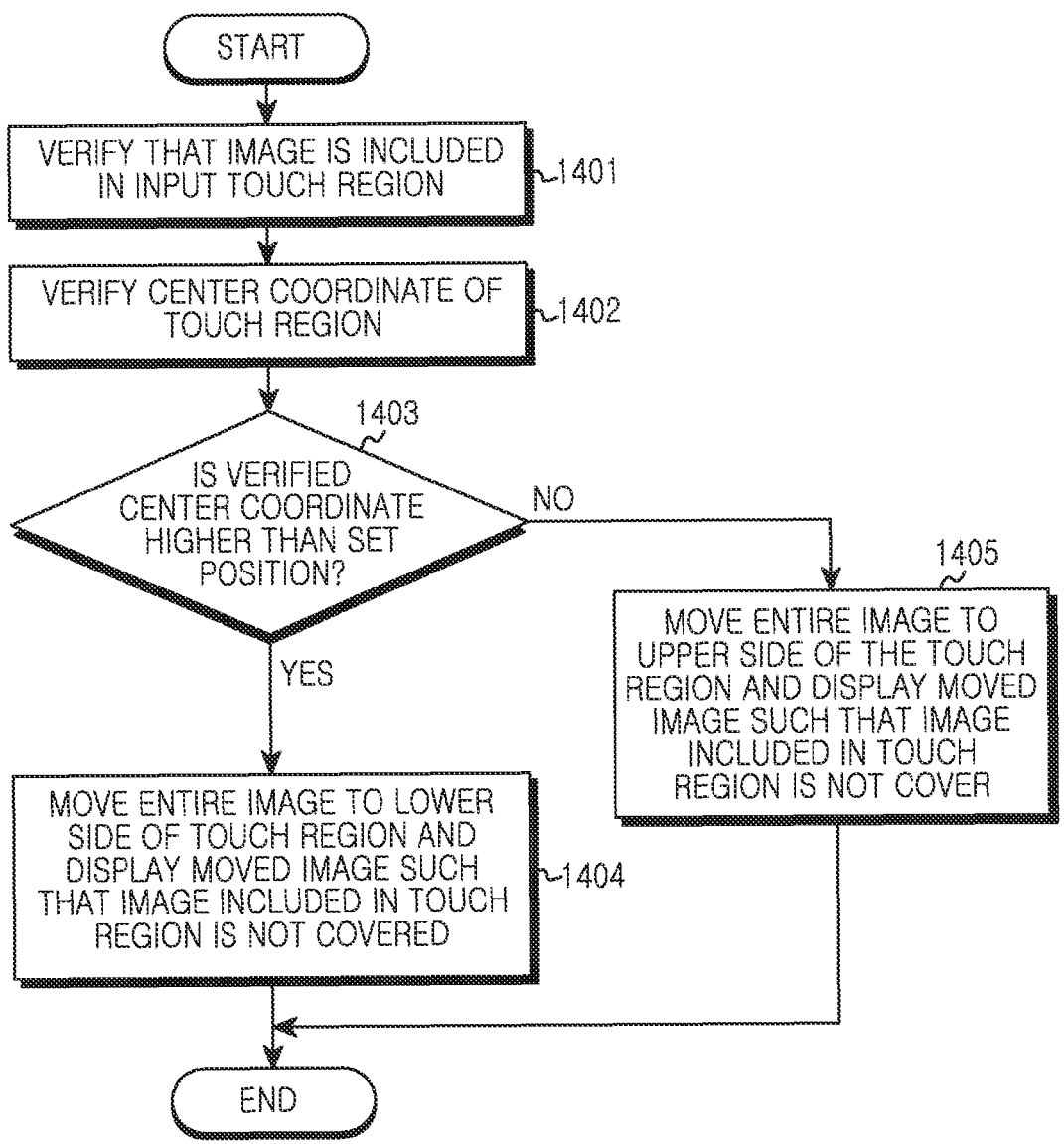
FIG. 14 is a flowchart illustrating a process of adjusting a layout of a screen such that an image included in a touch region is not covered according to an exemplary embodiment of the present invention.

FIG. 14 is a flowchart illustrating a process of adjusting a layout of a screen such that an image included in a touch region is not covered according to an exemplary embodiment of the present invention.

Referring to FIG. 14, an electronic device verifies whether an image is included in an input touch region in step 1401. In more detail, the electronic device may verify a touch region which receives a touch input from a user and may verify that the image is included in the verified touch region. For example, a webpage including an image is displayed, and the electronic device may receive the touch input of any one region on a displayed image.

Verifying that the image is included in the input touch region, the electronic device verifies a center coordinate of the touch region in step 1402. In more detail, when a touch input is received from the user, the electronic device verifies the center coordinate of the touch region to verify an accurate touch point.

The electronic device determines whether the verified center coordinate is higher than a set position in step 1403. In more detail, when a touch input of any one region on the image displayed on the touch screen is received, the electronic device determines whether the center coordinate of the touch-input region is higher or lower than the set position.

If it is determined that the verified coordinate is higher than the set position, the electronic device moves the entire image to a lower side of the touch region and displays the moved image such that the image included in the touch region is not covered in step 1404. That is, if it is determined that the image is included in the region which receives the touch input from the user and it is determined that the touch-input region is higher than the set position, the electronic device may move the entire image to the lower side of the touch region and may display the moved image such that the image is not covered by the touch input. An electronic device of the related art does not provide a method of addressing a problem in that an image is covered by an input means although the touch input is received on an image displayed on a touch screen. However, if it is determined that the image is included in the touch region which receives the touch input from the user, the electronic device according to an exemplary embodiment of the present invention may move the image to a lower side of the touch region such that the image is not covered by the touch input. Accordingly, although the user performs a touch input on the image displayed on the touch screen, because the image is not covered by an input means of the user, there is an advantage in that the electronic device improves the user's convenience.

If it is determined that the verified center coordinate is lower than the set position, the electronic device moves the entire image to an upper side of the touch region and displays the moved image such that the image included in the touch region is not covered in step 1405. That is, if it is determined that the image is included in the region which receives the touch input from the user and it is determined that the touch-input region is higher than the set position, the electronic device may move the entire image to the upper side of the touch region and may display the moved image such that the image is not covered by the touch input. An electronic device of the related art does not provide a method of addressing a problem in that an image is covered by an input means although the touch input is received on an image displayed on a touch screen. However, if it is determined that the image is included in the touch region which receives the touch input from the user, the electronic device according to an exemplary embodiment of the present invention may move the image to an upper side of the touch region such that the image is not covered by the touch input. Accordingly, although the user performs a touch input on the image displayed on the touch screen, because the image is not covered by an input means of the user, there is an advantage in that the electronic device improves the user's convenience.

Figure 15:
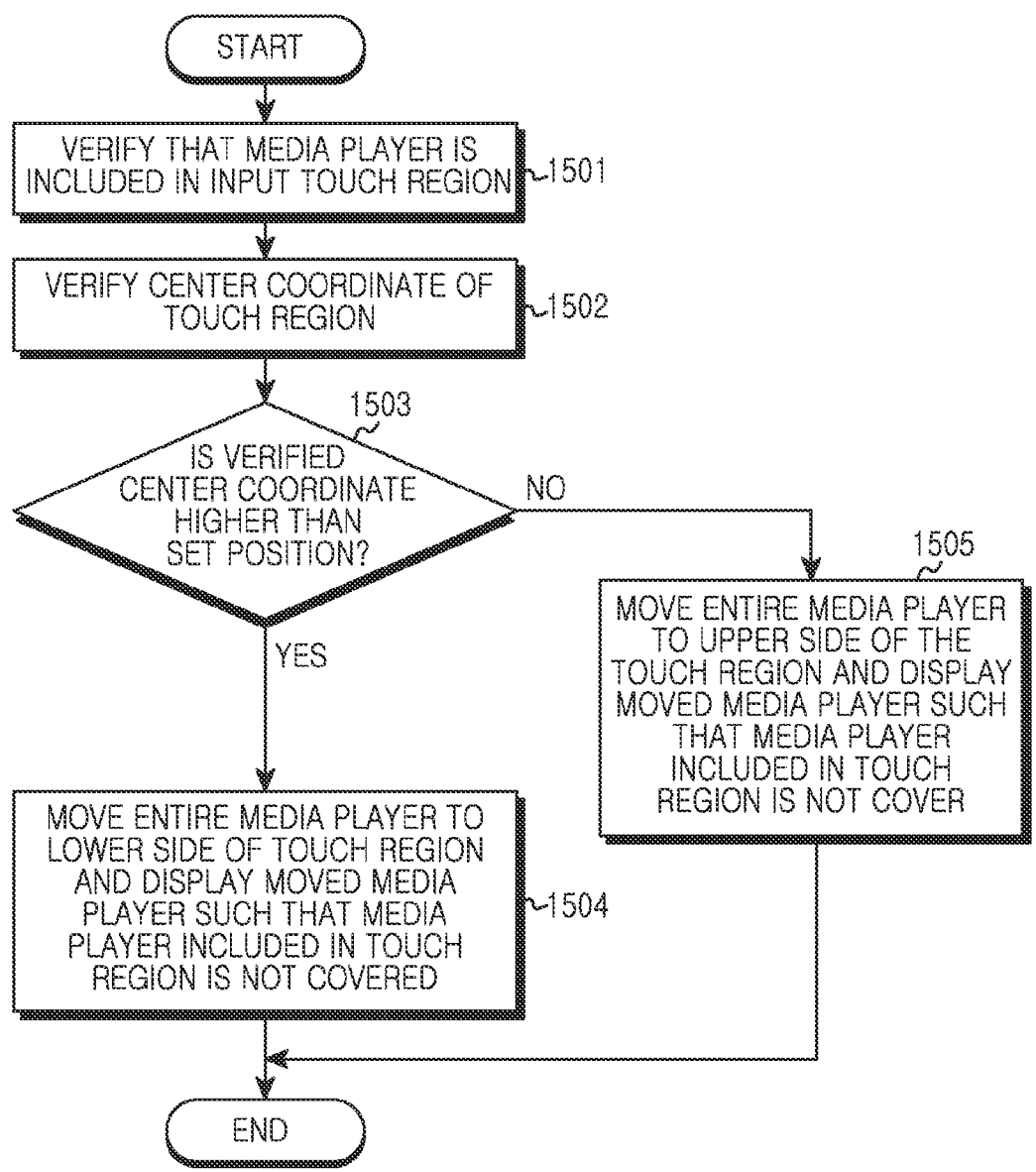
FIG. 15 is a flowchart illustrating a process of adjusting a layout of a screen such that a media player included in a touch region is not covered according to an exemplary embodiment of the present invention.

FIG. 15 is a flowchart illustrating a process of adjusting a layout of a screen such that a media player included in a touch region is not covered according to an exemplary embodiment of the present invention.

Referring to FIG. 15, an electronic device verifies whether a media player is included in an input touch region in step 1501. In more detail, the electronic device may verify a touch region which receives a touch input from a user and may verify that the media player is included in the verified touch region. For example, a webpage including a media player is displayed, and the electronic device may receive the touch input of any one region on a displayed media player from the user.

Verifying that the media player is included in the input touch region, the electronic device verifies a center coordinate of the touch region in step 1502. In more detail, when a touch input is received from the user, the electronic device verifies the center coordinate of the touch region to verify an accurate touch point.

The electronic device determines whether the verified center coordinate is higher than a set position in step 1503. In more detail, when a touch input of any one region on the media player displayed on the touch screen is received, the electronic device determines whether the center coordinate of the touch-input region is higher or lower than the set position.

If it is determined that the verified coordinate is higher than the set position, the electronic device moves the entire media player to a lower side of the touch region and displays the moved media player such that the media player included in the touch region is not covered in step 1504. That is, if it is determined that the media player is included in the region which receives the touch input from the user and it is determined that the touch-input region is higher than the set position, the electronic device may move the entire media player to the lower side of the touch region and may display the moved media player such that the media player is not covered by the touch input. An electronic device of the related art does not provide a method of addressing a problem in that a media player is covered by an input means although a touch input is received on a media player displayed on a touch screen. However, if it is determined that the media player is included in the touch region which receives the touch input from the user, the electronic device according to an exemplary embodiment of the present invention may move the media player to a lower side of the touch region such that the media player is not covered by the touch input. Accordingly, although the user performs a touch input on the media player displayed on the touch screen, because the media player is not covered by an input means of the user, there is an advantage in that the electronic device improves the user's convenience.

If it is determined that the verified center coordinate is lower than the set position, the electronic device moves the entire media player to an upper side of the touch region and displays the moved media player such that the media player included in the touch region is not covered in step 1505. That is, if it is determined that the media player is included in the region which receives the touch input from the user and it is determined that the touch-input region is lower than the set position, the electronic device may move the entire media player to the upper side of the touch region and may display the moved media player such that the media player is not covered by the touch input. An electronic device of the related art does not provide a method of addressing a problem in that a media player is covered by an input means although a touch input is received on a media player displayed on a touch screen. However, if it is determined that the media player is included in the touch region which receives the touch input from the user, the electronic device according to an exemplary embodiment of the present invention may move the media player to an upper side of the touch region such that the media player is not covered by the touch input. Accordingly, although the user performs a touch input on the media player displayed on the touch screen, because the media player is not covered by an input means of the user, there is an advantage in that the electronic device improves the user's convenience.

An exemplary electronic device for displaying a touch region to be shown and a method thereof allow the user to see the touch region without taking a finger, etc. used for touch off the touch screen.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of an electronic device, the operating method comprising:
  displaying a content comprising a plurality of texts on a touch screen of the electronic device;
  detecting a touch input while displaying the content on the touch screen;
  determining whether at least one text among the plurality of texts is included within a touch region in which the touch input is detected;

in response to determining that at least one text is included within the touch region, dividing, based on the touch region, the content into a first content and a second content;

shifting the first content or the second content by inserting an empty space between the first content and the second content;

in response to detecting that the touch input is moved, scrolling the shifted first content and second content, and the empty space according to the moved touch input;

in response to detecting that the moved touch input is released after the scrolling, combining the scrolled first content and second content by deleting the empty space; and displaying the combined first content and second content on the touch screen.

2. The operating method of claim 1, wherein the empty space comprises at least one of an empty horizontal line space between texts or an empty vertical line space between texts.

3. The operating method of claim 1, further comprising: determining a size of the empty space set by a user input.

4. The operating method of claim 1, further comprising: determining an area in which a position of the empty space is included among a plurality of areas of the touch screen; and determining a size of the empty space according to the determined area.

5. The operating method of claim 1, wherein the text comprises at least one of a number, a symbol or a character.

6. An operating method of an electronic device, the operating method comprising:

displaying an object on a touch screen;

detecting a touch input while displaying the object on the touch screen;

determining whether a touch region in which the touch input is detected is included within an area in which the object is displayed;

in response to the determining that the touch region is included in the area, determining whether a position of the touch region is higher than a preset position;

in response to determining that the position of the touch region is higher than the preset position, shifting the object to a first area, a position of the first area being lower than the preset position; and in response to determining that the position of the touch region is lower than the preset position, shifting the object to a second area, a position of the second area being higher than the preset position.

7. The operating method of claim 6, wherein the object comprises at least one of an image or a media player.

8. An electronic device comprising:
a touch screen; and
a processor configured to:
control the touch screen to display a content comprising a plurality of texts;
detect a touch input while displaying the content on the touch screen;
determine whether at least one text among the plurality of texts is included within a touch region in which the touch input is detected;
in response to determining that at least one text is included within the touch region, divide, based on the touch region, the content into a first content and a second content;
shift the first content or the second content by inserting an empty space between the first content and the second content;
in response to detecting that the touch input is moved, scroll the shifted first content and second content, and the empty space according to the moved touch input;
in response to detecting that the moved touch input is released after the scrolling, combine the scrolled first content and second content by deleting the empty space; and
control the touch screen to display the combined first content and second content.

9. The electronic device of claim 8, wherein the empty space comprises at least one of an empty horizontal line space between texts or an empty vertical line space between texts.

10. The electronic device of claim 8, wherein the processor is further configured to:
determine a size of the empty space set by a user input.

11. The electronic device of claim 10, wherein the processor is further configured to:
determine an area in which a position of the empty space is included among a plurality of areas of the touch screen; and
determine a size of the empty space according to the determined area.

12. The electronic device of claim 10, wherein the text comprises at least one of a number, a symbol or a character.

13. An electronic device comprising:
a touch screen; and
a processor configured to:
control the touch screen to displaying an object;
detect a touch input while displaying the object on the touch screen;
determine whether a touch region in which the touch input is detected is included within an area in which the object is displayed;
in response to the determining that the touch region is included in the area, determine whether a position of the touch region is higher than a preset position;
in response to determining that the position of the touch region is higher than the preset position, shift the object to a first area, a position of the first area being lower than the preset position; and
in response to determining that the position of the touch region is lower than the preset position, shift the object to a second area, a position of the second area being higher than the preset position.

14. The electronic device of claim 13, wherein the object comprises at least one of an image or a media player.

* * * * *